(12) United States Patent
Lee et al.

(10) Patent No.: US 10,650,816 B2
(45) Date of Patent: May 12, 2020

(54) PERFORMING TASKS AND RETURNING AUDIO AND VISUAL FEEDBACKS BASED ON VOICE COMMAND

(71) Applicant: KT CORPORATION, Gyeonggi-do (KR)

(72) Inventors: Sang-Wook Lee, Seoul (KR); Hyun-Jung Kang, Seoul (KR); Sun-Jong Kwon, Seoul (KR); Mi-Hee Kim, Seoul (KR); Jin-Han Kim, Gyeonggi-do (KR); Gyu-Tae Baek, Seoul (KR); Joo-Won Sung, Seoul (KR); Kyeong-Jin Oh, Incheon (KR); Jin-Young Oh, Seoul (KR); Ji-Hui Im, Gyeonggi-do (KR); Du-Seong Chang, Gyeonggi-do (KR); Won-Seock Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 95 days.

(21) Appl. No.: 15/872,966

(22) Filed: Jan. 16, 2018

(65) Prior Publication Data

US 2018/0322870 A1 Nov. 8, 2018

(30) Foreign Application Priority Data

May 8, 2017 (KR) .......................... 10-2017-0057601
May 8, 2017 (KR) .......................... 10-2017-0057609

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G10L 15/265* (2013.01); *G10L 15/30* (2013.01);
(Continued)

(58) Field of Classification Search
USPC .................................. 704/231–257, 270–275
See application file for complete search history.

(56) References Cited

U.S. PATENT DOCUMENTS

| 5,777,614 A | 7/1998 | Ando et al. |
| 6,570,555 B1 | 5/2003 | Prevost et al. |

(Continued)

FOREIGN PATENT DOCUMENTS

| CN | 105046238 A | 11/2015 |
| JP | 08-166866 A | 6/1996 |

(Continued)

*Primary Examiner* — Jesse S Pullias
(74) *Attorney, Agent, or Firm* — IP Legal Services, LLC

(57) ABSTRACT

An artificial intelligence voice interactive system may provide various services to a user in response to a voice command. The system may perform at least one of: receiving user speech from a user; transmitting the received user speech to the central server; receiving at least one of control signals and audio and video answers, which are generated based on an analysis and interpretation result of the user speech, from at least one of the central server, the internal service servers, and the external service servers; and outputting the received audio and video answers through at least one of speakers and a display coupled to the user interactive device and controlling at least one device according to the control signals.

10 Claims, 22 Drawing Sheets

(51) Int. Cl.
   *G10L 15/30*     (2013.01)
   *G06F 3/16*      (2006.01)
   *H04N 21/422*    (2011.01)
   *H04N 21/439*    (2011.01)
   *G10L 15/26*     (2006.01)

(52) U.S. Cl.
   CPC ... *H04N 21/42203* (2013.01); *H04N 21/4394* (2013.01); *G10L 2015/223* (2013.01); *G10L 2015/227* (2013.01); *G10L 2015/228* (2013.01)

(56) References Cited

U.S. PATENT DOCUMENTS

| | | |
|---|---|---|
| 6,570,588 B1 | 5/2003 | Ando et al. |
| 7,426,467 B2 | 9/2008 | Nashida et al. |
| 9,199,122 B2 | 12/2015 | Kaleal, III et al. |
| 9,691,221 B2 | 6/2017 | Block et al. |
| 2002/0108110 A1* | 8/2002 | Wugofski ............. H04N 7/165 725/38 |
| 2002/0111794 A1 | 8/2002 | Yamamoto et al. |
| 2003/0220799 A1 | 11/2003 | Kim et al. |
| 2007/0120959 A1 | 5/2007 | Wu et al. |
| 2008/0183678 A1 | 7/2008 | Weston et al. |
| 2010/0057644 A1* | 3/2010 | Barton .................. G09B 5/00 706/11 |
| 2010/0153868 A1 | 6/2010 | Allen et al. |
| 2011/0201414 A1 | 8/2011 | Barclay et al. |
| 2011/0288868 A1 | 11/2011 | Lloyd et al. |
| 2012/0022874 A1 | 1/2012 | Lloyd et al. |
| 2012/0262296 A1* | 10/2012 | Bezar .................... G10L 17/26 340/573.1 |
| 2012/0278076 A1 | 11/2012 | Lloyd et al. |
| 2013/0035790 A1 | 2/2013 | Olivier, III et al. |
| 2013/0325466 A1 | 12/2013 | Babin |
| 2014/0143809 A1 | 5/2014 | Sung et al. |
| 2014/0278403 A1 | 9/2014 | Jacob et al. |
| 2015/0217199 A1 | 8/2015 | Cotter |
| 2015/0256873 A1 | 9/2015 | Klein et al. |
| 2015/0290795 A1 | 10/2015 | Oleynik |
| 2015/0379752 A1 | 12/2015 | Li et al. |
| 2016/0034458 A1 | 2/2016 | Choi et al. |
| 2016/0140960 A1 | 5/2016 | Chae |
| 2016/0174074 A1 | 6/2016 | Kim et al. |
| 2016/0210602 A1 | 7/2016 | Siddique et al. |
| 2016/0328014 A1 | 11/2016 | Huang et al. |
| 2016/0381202 A1 | 12/2016 | Koo et al. |
| 2017/0206797 A1 | 7/2017 | Solomon et al. |
| 2017/0236512 A1* | 8/2017 | Williams ............. G06F 16/68 381/79 |
| 2017/0264954 A1 | 9/2017 | Nakagawa et al. |
| 2018/0018793 A1 | 1/2018 | Min et al. |
| 2018/0019000 A1 | 1/2018 | Delpuch et al. |
| 2018/0047391 A1* | 2/2018 | Baik ...................... G10L 15/22 |
| 2018/0054612 A1 | 2/2018 | Kim et al. |
| 2018/0067381 A1 | 3/2018 | Aflatooni |

FOREIGN PATENT DOCUMENTS

| | | |
|---|---|---|
| JP | 10-020884 A | 1/1998 |
| JP | 2004-005530 A | 1/2004 |
| JP | 2006-317722 | 11/2006 |
| JP | 2014-191272 A | 10/2014 |
| JP | 2015-060391 A | 3/2015 |
| KR | 10-0331033 B1 | 4/2002 |
| KR | 10-0644027 B1 | 11/2006 |
| KR | 10-0768653 B1 | 10/2007 |
| KR | 10-2008-0099883 A | 11/2008 |
| KR | 10-2009-0092946 A | 9/2009 |
| KR | 10-0955247 B1 | 4/2010 |
| KR | 10-2011-0059178 A | 6/2011 |
| KR | 10-2013-0113307 A | 10/2013 |
| KR | 10-2013-0137332 A | 12/2013 |
| KR | 10-1339684 B1 | 12/2013 |
| KR | 10-2014-0066025 A | 5/2014 |
| KR | 10-2016-0011620 A | 2/2016 |
| KR | 10-2016-0014926 A | 2/2016 |
| KR | 10-2016-0058523 A | 5/2016 |
| KR | 10-2016-0071111 A | 6/2016 |

\* cited by examiner

PERFORMING TASKS AND RETURNING AUDIO AND VISUAL FEEDBACKS BASED ON VOICE COMMAND

CROSS REFERENCE TO PRIOR APPLICATIONS

The present application claims priority under 35 U.S.C. § 119 to Korean Patent Application No. 10-2017-0057609 (filed on May 8, 2017) and to Korea Patent Application No. 10-2017-0057601 (filed on May 8, 2017).

The subject matter of this application is related to U.S. patent application Ser. No. 15/641,843, filed Jul. 5, 2017, and U.S. patent application Ser. No. 15/676,974, the teachings of which are incorporated herein in their entirety by reference.

BACKGROUND

The present disclosure relates to performing tasks in response to user speech and, more particularly, to performing various tasks in response to a voice command and providing audio and visual feedbacks thereof.

Due to advances in speech recognition technology, major electronics manufacturers have introduced many electronic devices capable of performing tasks in response to user's voice command. Through such electronic devices, a user may perform simple tasks. However, there are many restrictions and obstacles to overcome for providing various types of services to users based on voice commands, performing tasks associated with the services, and providing audio and video feedbacks in response to the voice commands.

SUMMARY

In accordance with an aspect of the present embodiment, an artificial intelligence voice interactive system may recognize voice commands included in user speech and perform associated tasks in cooperation with at least one of servers including legacy systems based on interpretation and analysis on the voice commands and context information thereof.

In accordance with another aspect of the present embodiment, an artificial intelligence voice interactive system may perform various tasks based on recognized voice commands in user speech and provide a user with audio and video results through various associated devices.

In accordance with still another aspect of the present embodiment, i) user speech may be received through a user interactive device, ii) voice commands may be extracted from the user speech, iii) the extracted voice commands may be interpreted and analyzed based on context information of the user interactive device, and iv) services associated with the interpretation result and the analysis result may be provided to the user interactive device.

In accordance with yet another aspect of the present embodiment, intention of user speech may be determined by analyzing voice commands extracted from the user speech based on associated context information. Based on the determined intention, at least one service may be determined, associated control signals may be generated, associated tasks may be performed based on the determined service, at least one of devices may be controlled based on the generated control signals, audio and video feedbacks may be generated based on the results of performing the tasks and controlling the devices, and the audio and video feedbacks may be output through speakers and displays coupled to the user interactive device.

In accordance with further another aspect of the present embodiment, an artificial intelligence voice interactive system may provide an interface between the voice interactive system and legacy systems to enable providing various types of existing services provided by the legacy systems in response to user speech without modifying the legacy systems.

In accordance with further still another aspect of the present embodiment, an artificial intelligence voice interactive system may perform various tasks based on recognized voice commands in user speech and selectively provide a user with audio and video results with characters tailed and dynamically changed according to at least one of the voice commands, a task to perform, and associated context information.

In accordance with further another aspect of the present embodiment, an artificial intelligence voice interactive system may enable a user to perform operations each associated with menus and options of an application of a determined service in response to user speech.

In accordance with further another aspect of the present embodiment, an artificial intelligence voice interactive system may provide audio and video feedback in response to user speech on a display in an overlapping manner.

In accordance with at least one embodiment, a method may be provided for providing voice interactive services to a user through an artificial intelligence voice interactive system including a user interactive device, a central server, a plurality of internal service servers, and a plurality of external service servers each connected to the central server through a communication network. The method of the user interactive device my include receiving user speech from a user; transmitting the received user speech to the central server; receiving at least one of control signals and audio and video answers, which are generated based on an analysis and interpretation result of the user speech, from at least one of the central server, the internal service servers, and the external service servers; and outputting the received audio and video answers through at least one of speakers and a display coupled to the user interactive device and controlling at least one device according to the control signals.

In accordance with another embodiment, a method may be provided providing a service in response to user speech by a user interactive device. The method may include receiving user speech from a user; analyzing and interpreting the user speech; generate at least one of control signals and audio and video feedback based on the analysis and interpretation results; and outputting the audio and video feedback through a display coupled to the user interactive device according to the control signals.

In accordance with still another embodiment, a server may be provided for providing a service in response to user speech. The server may include a communication circuit configured to communication with other entities including a user interactive device and external service servers; a memory configured to store data and information; a processor configured to: determine a service to be provided through the user interactive device based on analysis and interpretation result of user speech received through the user interactive device; determine whether the determined service requires cooperation of at least one external service server; request a corresponding external service server to perform tasks to provide the determined service and generate at least one of control signals and audio and video feedback as a result when the determined service requires cooperation of the corresponding external service server; and perform tasks to provide the determined service and generate at least one of control signals and audio and video feedback as a result and transmit the control signals and the audio and video feedback to the user interactive device.

In accordance with yet another embodiment, a server may be provided for providing a service based on user speech. The server may include a communication circuit configured to communication with other entities including a user interactive device and external service servers; a memory configured to store data and information; a processor configured to: receive user speech from a user interactive device through the communication circuit and extract voice commands from the user speech; analyze and interpret the voice commands based on context information of the user interactive device; and generate audio and video feedback as an answer to the user speech and transmit the audio and video feedback to the user interactive device.

In accordance with further another embodiment, a server may be provided for providing a service based on user speech. The server may include a communication circuit configured to communication with other entities including a user interactive device and external service servers; a memory configured to store data and information; a processor configured to: receive user speech from a user interactive device through the communication circuit; determine whether a service determination is required by interpreting the user speech; when the service determination is required, analyze the user speech based on context information of the user interactive device, generate audio and video feedback as an answer to the user speech, and transmit the audio and video feedback to the user interactive device; and when the service determination is not required, transmit the user speech interpreting result to the user interactive device.

DETAILED DESCRIPTION OF EMBODIMENTS

In accordance with at least one embodiment, an artificial intelligence voice interactive system may provide services to a user in response to user speech. In particular, i) user speech may be received through a user interactive device ii) at least one of voice commands may be extracted from the user speech, iii) the extracted voice commands may be interpreted and analyzed based on context of the user interactive device, and iv) services associated with the interpretation result and the analysis result may be provided to the user interactive device.

Furthermore, intention of user speech may be determined by analyzing voice commands extracted from the user speech based on associated context information. Based on the determined intention, at least one service may be determined, associated control signals may be generated, associated tasks may be performed based on the determined service, at least one of devices may be controlled based on the generated control signals, audio and video feedbacks may be generated based on the results of performing the tasks and controlling the devices, and the audio and video feedbacks may be output through speakers and displays coupled to the user interactive device.

In addition, the artificial intelligence voice interactive system may enable a user to perform tasks each associated with menus and options of an associated application in response to user speech in accordance with at least one embodiment. Further, the artificial intelligence voice interactive system may provide not only an audio feedback through associated speakers but also a video feedback through an associated speaker in response to user speech. Such a video feedback may be displayed on a display in an overlapping manner while other video contents are reproduced and displayed on the display in accordance with at least one embodiment.

In order to provide such artificial intelligence voice interactive services, the artificial intelligence voice interactive system may include a user interactive device, a central server including a plurality of internal service servers, and a plurality of external service servers each connected to related legacy systems, which are connected through at least one communication network. Such a system will be described in more detail with reference to FIG. 1.

Figure 1:
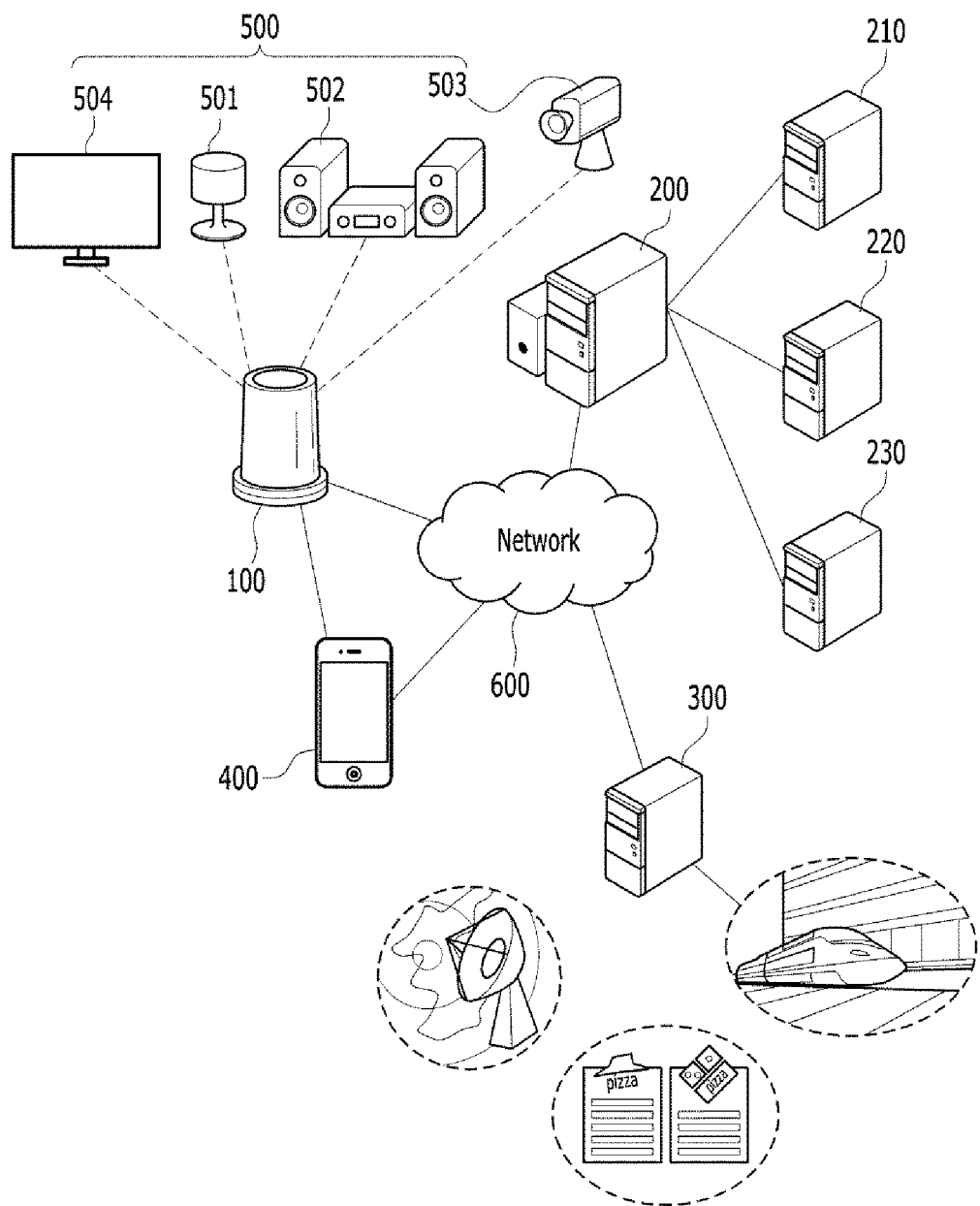
FIG. 1 illustrates an artificial intelligence voice interactive system in accordance with at least one embodiment.

FIG. 1 illustrates an artificial intelligence voice interactive system in accordance with at least one embodiment. Referring to FIG. 1, the artificial intelligence voice interactive system may include user interactive device 100, central server 200, a plurality of internal service servers 210, 220, and 230, a plurality of external service servers 300 (301 to 30N), user portable device 400, and a plurality of electronic devices 500 (e.g., Internet of Things (IoT) devices 501 to 504) in accordance with at least one embodiment.

User interactive device 100 may listen to speech made by a user, recognize at least one of voice commands from the speech, and transmit data of the recognized voice commands to at least one of central server 200, internal service servers 210 to 230 and external service servers 300 through a communication link. Furthermore, user interactive device 100 may receive control signals and audio and video feedback (e.g., audio and video answer to user speech) in association with the received user speech from at least one of central server 200, internal service servers 210 to 230, and external service servers 300, control at least one devices 500 or perform a predetermined task based on the control signals, and outputs the received audio and video feedback through at least one of speakers and displays in accordance with at least one embodiment.

Such user interactive device 100 may be referred to as an audio response artificial intelligent device, a voice interactive artificial intelligent device, and a GiGA Genie®. Such user interactive device 100 may an electronic device that i) includes at least one processor, a memory, a microphone, a speaker, and a communication circuit and ii) is capable of performing various operations for listening to speech, recognizing at least one voice command from the speech, recording speech after a certain wakeup word (e.g., initiation word), and transferring the recognized command and the recorded speech to other devices through communication network 600. In accordance with at least one embodiment, user interactive device 100 may include an interface for controlling IoT devices 500, a telecommunication controller (e.g., telephony circuit) for making a phone call or a video call to a predetermined person through a telecommunication network (e.g., 3GPP network) and an Internet network (e.g., data network), and a set-top box circuit for directly receiving signals from at least one broadcasting station and processing the received signals into video and audio contents in a form displayed on a display and outputted through a speaker (e.g., including a TV-tuner input and displays output to a display). User interactive device 100 may be designed and manufactured dedicatedly for providing artificial intelligence voice interactive services in response to user command using artificial intelligence voice interactive technology. However, the embodiments of the present disclosure are not limited thereto. User interactive device 100 may be any electronic device including at least one processor, a memory, a speaker, a microphone, and a communication circuit for performing the above-mentioned tasks, such as recognizing voice commands and transferring the voice commands to central server 200.

In accordance with at least one embodiment, user interactive device 100 may be installed or deployed at a predetermined location, as a stationary device and connected to communication network 600 for communicating with other entities such as Internet of Things (IoT) devices 500, user portable device (e.g., smart phone) 400, central server 200, internal service servers 210 to 230, and external service servers 300. However, embodiments of the present disclosure are not limited thereto. For example, user interactive device 100 may be a portable device carried with a user. After user interactive device 100 is turned on (powered on), user interactive device 100 may always listen to sound or speech generated within a predetermined area. User interactive device 100 may recognize at least one voice command from the sound or speech. For example, user interactive device 100 recognizes a voice command when user interactive device 100 detects a predetermined word (e.g., a wake-up word or initiation word) in the speech. User interactive device 100 may recognize a certain length of a speech after the wake-up word as a voice command, record it, and store it as a certain format of digital data.

As described, user interactive device 100 may simply receive user speech, transmit the received user speech to central server 200, receive control signals and audio and video feedback in association with the received user speech, control at least one devices 500, perform at least one task based on the control signals, and outputs the received audio and video feedback through at least one of speakers and displays in accordance with at least one embodiment.

For example, user interactive device 100 may generate a message including information (e.g., certain format of binary data) on the recognized voice commands (e.g., user speech recorded in a certain data format) and transmit the generated message to central server 200 through communication network 600. The information may include text data or audio data of the recognized voice command. In addition, user interactive device 100 may packetize supplementary information into the message, such as user identification information, device identification information, and so forth. The supplementary information may include context information of user interactive device 100. The context information may be information on a current status of user interactive device 100, a location of user interactive device 100 or a related user, histories of previously recognized voice commands, previously provided services, and previously performed tasks, or surrounding information thereof. Such configuration and operation of user interactive device 100 will be described more detail later with accompanying drawings.

As described, user interactive device 100 may simply transfer the received user speech to central server 200, receive the results of providing associated services and performing associated tasks from central server 200, and output audio and video feedback to user as the results in accordance with at least one embodiment. However, the embodiments are not limited thereto. For example, user interactive device 100 may identify and extract voice commands from the user speech, interpret and analyze the extracted voice commands, and determine services and associated servers based on the interpretation and analysis results.

In accordance with at least one embodiment, user interactive device 100 may interpret and analyze the voice commands included in user speech, determine whether the voice commands are associated with an internal service which can be provided by internal service servers 200, 210, 220, and 230. If the voice command is associated with an internal service (e.g., internal task), user interactive device 100 may perform, based on the interpretation and analysis result of user interactive device 100, at least one task associated with the voice commands in cooperation with central server 200, internal service servers 210 to 230 and output audio and video feedbacks (e.g., result or signal) through at least one of a speaker and a display. Herein, the speaker and the display may be a standalone device from user interactive device 100, connected to user interactive device 100 through a predetermined communication link established between the standalone device and user interactive device 100, and controlled by user interactive device 100. Alternatively, the speaker and the display may be integrally included in user equipment 100 as internal units. Furthermore, the audio and video feedbacks may be audio data and video data generated as an answer of the user speech and results of performing associated tasks and providing associated services.

For another example, if user interactive device 100 determines that the voice command is associated with an external service (e.g., external task) or requires additional analysis (e.g., second analysis), user interactive device 100 may i) transmit the received user speech or ii) analyze the user speech and transmit the result as a first analysis result to central server 200 and request central server 200 for additional analysis on the user speech or the first analysis result. Central server 200 may generate an instruction (e.g., voice command) based on the second analysis result and transmit the instruction to server 300 or perform an associated task in cooperation with server 300. For convenience and ease of understanding, user interactive device 100 is described as transmitting the received user speech (e.g., voice commands) and the first analysis result directly to central server 200. However, embodiments of the present disclosure are not limited thereto. For example, user interactive device 100 may transmit the recorded user speech (e.g., voice commands) and the first analysis result directly to at least one of internal service servers 210 to 230 and external service servers 300.

In particular, user interactive device 100 may transmit the received user speech to central server 200 according to whether the first analysis result of user interactive device 100 or the user speech requires second analysis of central server 200. In this case, central server 200 may i) receive the first analysis result of user interactive device 100 and/or the user speech from user interactive device 100, ii) analyze the received first analysis result or the received user speech, iii) generate a control signal or determine a task (e.g., service) corresponding to the second analysis result, iv) transmit the control signal to a predetermined device including user interactive device 100 or perform the determined task in cooperation with user interactive device 100, and v) transmit a task result (e.g., audio and video feedback) to user interactive device 100. In particular, if the determined task does not require cooperation with external service server 300 (e.g., legacy system), central server 200 may generate a control signal corresponding to the second analysis result and audio and video feedbacks and transmit the control signal and the audio and video feedbacks to user interactive device 100. If the determined task requires cooperation with external service server 300 (e.g., legacy system), central server 200 may generate a request signal including necessary information, transmit the generated request signal to corresponding service server 300, perform a determined task in cooperation with the service server 300, return a result to user interactive device 100. User interactive device 100 may output the result of performing the determined task through at least one of internal speakers, internal displays, external speakers, and external display.

As described above, central server 200 may be a computing system connected to user interactive device 100, a plurality of internal service servers 210 to 230, and a plurality of external service servers 300 through communication network 600 in accordance with at least one embodiment. Such central server 200 may be located at a remote place from user interactive device 100. For example, central server 200 is located at a central building of a service provider of the artificial intelligence voice interactive services. Central server 200 may be a computing system including at least one processor, at least one memory, and at least one communication circuit for performing operations for providing artificial intelligence voice interactive services in cooperation with at least one of internal service servers 210 to 230 and external service servers 300 or legacy systems based on voice commands (e.g., user speech). For example, central server 200 may perform operations of receiving at least one of user speech, recognized voice commands, first analysis result, and context information from user interactive device 100, analyzing the received user speech, voice commands, first analysis result and context information, determining at least one of services or tasks based on the analysis result, determining whether the determined tasks are an internal task (e.g., internal service) or an external task (e.g., external service), performing the determined tasks using at least one of internal servers 210 to 230 and at least one of external service servers 300 each associated with legacy system and transmitting control signals and audio and video results of performing tasks through various devices around a user. Herein, the external task is a task requiring at least one of service servers 300 to perform necessary operations. The internal task is a task not requiring any of service servers 300 to perform necessary operations of the determined task or requiring any of internal servers 200, 210, 220, and 230. That is, the external task may be a service used to be provided by a legacy system. The external task may be referred to as an external service, and the internal task may be also referred to as an internal service.

When central server 200 determines that the requested task is the external task, central server 200 may generate an instruction message in a predetermined standard format based on registration information of a corresponding service server and transmit the generated instruction message to the corresponding service server. Such a format and parameters for the instruction message may be predetermined by at least one of service providers (e.g., system designers, operators, and manufacturer) of central server 200 and service servers 300 for cooperation therebetween. For example, central server 200 may provide a standard message format to various service servers (e.g., vendors) and request service servers to generate a message according to the standard message format in order to communicate to each other and provide a voice interactive interface to non-voice interactive systems. Further, central server 200 may request service servers 300 to upload information about what information is required from a user or a user's vice command to perform to operations (e.g., tasks) for providing legacy services of service servers 300. That is, central server 200 may convert a voice interactive command to a certain format of a message (e.g., instruction message) that can be interpreted by legacy systems or non-voice interactive systems.

Furthermore, the internal task (e.g., internal service) may denote a service that can be provided using only internal infra or internal resources without $3^{rd}$ party external service servers 300. In accordance with at least one embodiment, the internal task may be referred to as an internal service including a TV tuning service and a video on demand (VOD) service, which are typically provided by a set-top box, and a telephony service (e.g, telecommunication service) including a voice telephone service and a video telephone service. The external task (e.g., external service) denotes a service that requires cooperation with 3$^{rd}$ party (e.g., legacy systems), through service servers 300. That is, the external service may be a service provided through an external app additionally installed in user interactive device 100.

Such an internal service may be provided only by user interactive device 100 or in cooperation with central server 200 and other internal service servers 210 to 230. For example, an internal service may be a TV tuning service. User interactive device 100 may directly recognize voice commands for changing a channel, increasing/decreasing volume, turning on/off a TV, generate at least one control signal based on the recognized voice commands, and transmit the generated at least one control signal to display 504 coupled to user interactive device 100.

Furthermore, an internal service may be a VOD service, a voice telephone service, and a video telephone service. In this case, user interactive device 100 may i) recognize voice commands for the VOD service, the voice call service, and the video call service, ii) transmit the recognized voice commands (e.g., user speech and context information) to central server 200. Central server 200 may perform tasks to provide the requested service in cooperation with other internal servers 210 to 230, generate at least one control signals and audio and video feedbacks, and provide the results of performing the tasks and the generated control signals and audio and video feedbacks to user interactive device 100. Such operation will be described in more details.

For convenience for description and ease of understanding, user interactive device 100 is an independent device from central server 200 in at least one embodiment of the present disclosure. However, the embodiments of the present disclosure are not limited thereto. User interactive device 100 may include all the functions of central server 200, or user interactive device 100 and central server 200 may be implemented as one device in another embodiment of the present disclosure. Configuration and operations of central server 200 will be described in more detail in later with accompanying drawings.

In accordance with at least one embodiment, external service servers 300 may be a computing system for performing a task in cooperation with legacy systems for providing the external service (e.g., external task) which is a legacy service or a non-voice interactive service in response to a voice command and providing audio and video results of performing the task to at least one of user interactive device 100 and central server 200. For example, service servers 300 may be a non-voice interactive system that does not have functions for recognizing and responding to user speech. For example, service servers 300 may include i) food service server 301 for electrically or digitally ordering foods from existing, typical, and traditional restaurants 310 and physically delivering the ordered foods to a predetermined location, ii) weather service server 302 for requesting weather information to a predetermined organization 320 (e.g., local weather station or broadcasting center) and informing of a user the requested weather information, and iii) transportation service server 303 for electrically or digitally reserving seats of a predetermined transportation and purchasing tickets thereof from a train station or an airport 330. A typical food delivery system (e.g., legacy system) provides a web-page (e.g., typical interface) to a user for ordering a pizza, and the user has to manually fill up the web-page with detail information to order the pizza. Such a legacy system (e.g., typical food delivery system) is not a voice interactive system. That is, such a service server associated with a legacy system does not have an interface cooperating with a voice interactive system. In accordance with at least one embodiment, service servers 300 may be an interface between the voice interactive system (e.g., central service 200) and the legacy system (e.g., legacy systems 310, 320, and 330) to provide various types of services of the legacy system to users without modifying the existing legacy systems. In FIG. 1, legacy systems 310, 320, and 330 are illustrated different and independent systems from service servers 301, 302, and 303. However, the embodiments of the present disclosure are not limited thereto. For example, a service server may be a legacy system. That is, a service server is a non-voice interactive system that provides a service in a typical online manner, for example, requiring a user to manually fill up an associated web-site for providing a certain service.

Further, such service servers 300 may be a computer system owned by a service provider different from that of central server 200. Accordingly, service servers 300 may have identification different from that of central server 200. That is, service servers 300 may be installed or deployed at remote places from central server 200. Since service servers 300 are owned and operated by different service providers from central server 200, service servers 300 and central server 200 may cooperate together based on agreements made between two parties. Accordingly, communication between central server 200 and service server 300 may use communication networks and schemes different from i) internal communication in one computing system owned and operated by one service provider, and ii) communication between central server 200 and user interactive device 100.

In accordance with at least one embodiment, service servers 300 may be registered at central server 100. Upon the registration, service servers 300 may provide central server 200 with information to perform tasks (e.g., services) of service server 300. That is, service server 300 may upload essential information to central server 200. The essential information may be i) information required to perform tasks or services (e.g., legacy services) and ii) information required to identify one service server from the others. Such registration information may include tasks (e.g., services) to perform, service identification words, essential information to perform tasks in cooperation with associated legacy systems, message formats to communicate with central server 200 and digitally receive instructions and digitally transmit results thereof, and likes. For example, service servers 300 may be 3$^{rd}$ party computing systems that i) are designed to provide digital solutions to associated legacy systems, and ii) have a predetermined contract with the artificial intelligence voice interactive system.

In accordance with at least one embodiment, service servers 300 may receive an instruction message from central server 200, perform a task based on information in the instruction message in cooperation with legacy systems, generate a result message based on the registration information of corresponding service servers 300, and transmit the result message to at least one of user interactive device 100 and central server 200. As described, the instruction message may be generated by central server 200 based on the registration information of corresponding service server 300. Accordingly, service server 300 may convert information in the instruction message to cooperate with legacy systems, for example, digitally and automatically filling up a pizza order page of a web-page of a pizza service server (e.g., legacy system) and place an order of a pizza in response to a voice command entered in user interactive device 100. After performing the task, service servers 300 generates a result message based on the registration information.

Meanwhile, user interactive device 100, central server 200, and a plurality of service servers 300 are communicated with each other through communication network 600. Communication network 600 may be any wired and wireless network that digitally connects user interactive device 100, central server 200, a plurality of service servers 300, and smart phone 400 to enable them to digitally communicate to each other. In particular, network 600 may include a local area network (LAN), metropolitan area network (MAN), or wide area network (WAN). Furthermore, communication network 600 may include an Internet (world wide web: www), a wired and wireless data communication network (e.g., 3G, 4G, 5G, 3GPP ($3^{rd}$ generation partnership project), Long term evolution (LTE), world interoperability for microwave access (WIMAX), Wi-Fi, Bluetooth communication, infrared communication, ultrasound communication, visible light communication (VLC), and LiFi. As described, communication network 600 between user interactive device 100 and central server 200 may be different from communication network 600 between central server 200 and service servers 300. Further, a communication scheme used between user interactive device 100 and central server 200 may be different from a communication scheme used between central server 200 and service servers 300.

As described, the artificial intelligence voice interactive system may provide various types of services to a user in response to user speech (e.g., voice commands) with cooperation with a plurality of service servers in accordance with at least one embodiment. As described, various types of services may include legacy services used to be provided by legacy systems. Hereafter, overall operation of the artificial intelligence voice interactive system will be described with reference to FIG. 2.

Figure 2:
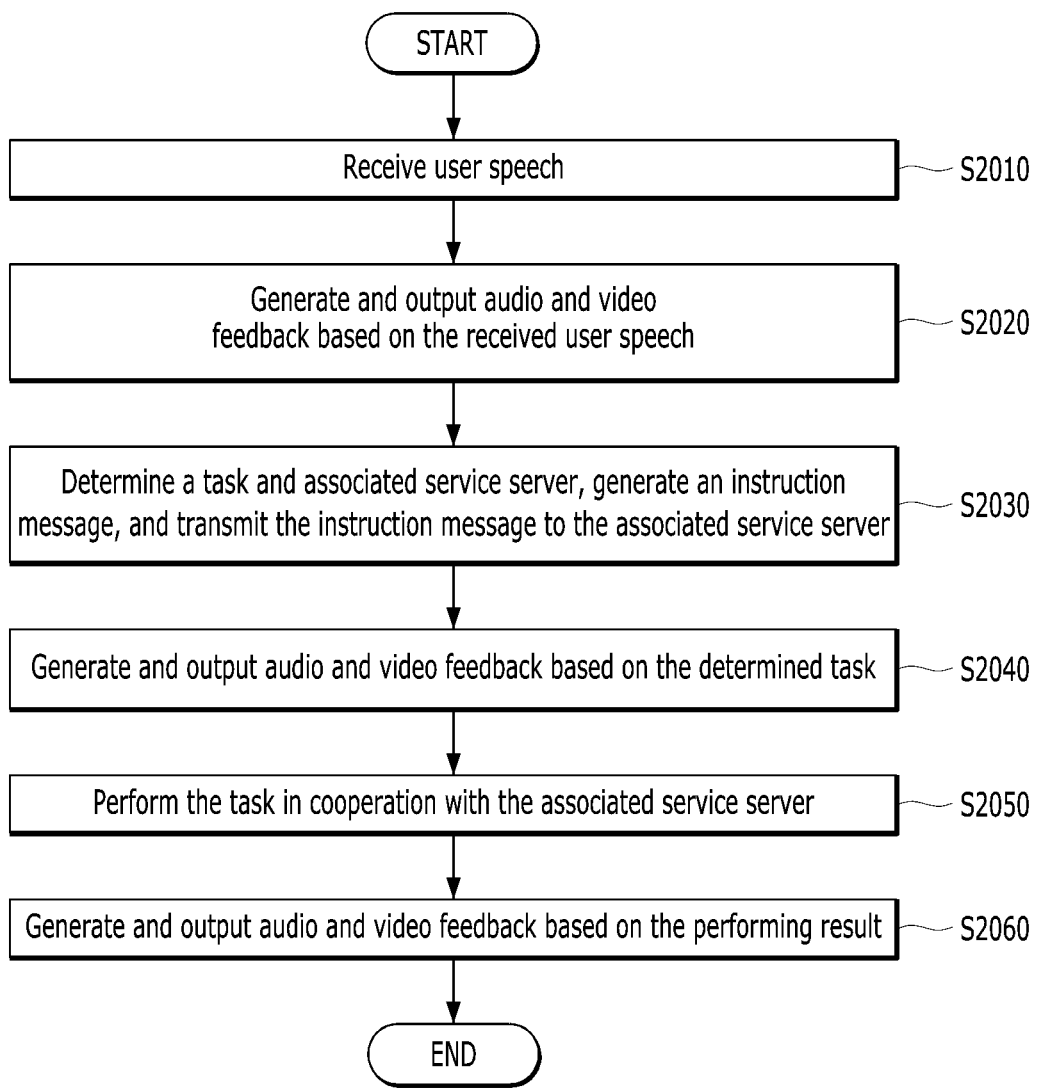
FIG. 2 is a flowchart illustrating overall operation of an artificial intelligence voice interactive system in accordance with at least one embodiment of the present disclosure.

FIG. 2 is a flowchart illustrating overall operation of an artificial intelligence voice interactive system in accordance with at least one embodiment of the present disclosure. Referring to FIG. 2, a user speech may be received from a user at step S2010. For example, after user interactive device 100 is installed and powered on, user interactive device 100 listens speech or sound generated at a predetermined area, recognizes at least one of voice commands included in the speech or the sound, generates data corresponding to the voice commands, and transmits the generated data to central server 200.

At step S2020, at least one audio and video feedback may be created based on the recognized voice commands and outputted through user interactive device 100 and associated output devices (e.g., internal speakers or display, or external devices, such as display 504 and speaker 502). For example, when user interactive device 100 recognizes a wakeup word, user interactive device 100 may transmit a task initiation signal including the recording of the wakeup word and associated user speech to central server 200. Upon generation of such event (e.g., task initiation event, task result receipt event), central server 200 may initiate an audio and video feedback generation operation for generating audio and video feedback based on the user speech and context information of user interactive device 100.

At step S2030, i) at least one service to be performed may be determined, such as an internal service or an external service, and ii) at least one service server to perform the task (e.g., if necessary) associated with the determined service may be selected based on the received data. Further, iii) an instruction message may be generated based on the determined service, the selected service server, and registration information of the selected server, and iv) the generated instruction message may be transmitted to the selected service server. For example, central server 200 receives the data including information on the received voice commands and supplementary information (e.g., context information) from user interactive device 100. The data may be audio data that includes user speech recorded for a predetermined duration after detecting a wakeup word. The supplementary information (e.g., context) may be information on identification of user interactive device 100, identification of a user making speech, a current status of user interactive device 100, a location of user interactive device 100, context information of user interactive device 100 (e.g., collectable information about surroundings of user interactive device 100, such as temperature, pictures, sounds, sending signals, and histories of previously recognized voice commands, previously performed tasks, and previously provided services, so forth). Central server 200 analyzes the received data, determines at least one task to be performed based on the analysis result, and selects at least one service server based on the determined task if the determined task is an external task requiring one of service servers 300 to perform the task. If the determined service is an internal service, central server 200 and user interactive device 100 may perform operations (e.g., tasks) related to the determined service without using external service servers 300. That is, when the determined service is the internal service, central server 200 and user interactive device 100 may determine tasks associated with the determined internal service and perform the determined tasks in response directly to user speech. In accordance with at least one embodiment, the internal service may include a video on demand (VOD) service, a TV control service, a voice call service, and a video call service.

If the determined service is an external service, one of external service servers 300 may be selected according to the determined service, In this case, central server 200 i) generates an instruction message in a predetermined format compatible with the selected service server based on the determined service, the selected service server, the registration information of the selected service server, and information included in the voice command and ii) transmits the generated instruction message to the selected service server through a communication network. As described, the instruction message may be generated according to formats and parameters included in the registration information of the selected service server. Accordingly, based on the instruction message, service servers 300 may cooperate with legacy systems and provide servers of the legacy systems to the user in response to a voice command although the legacy system cannot be interactive with a voice command. That is, when the determined service is the external service, the selection one of external service servers 300 may determine tasks associated with the determined external service and perform the determined tasks in response to the instruction message.

At step S2040, based on a task type, a required service server, and collected information (e.g. context) for determining the service and the task, at least one of control signals and audio and video feedback may be generated at step S2040. For example, upon generation of such event (e.g., task initiation event, a task performing event, task result receipt event), central server 200 may initiate the audio and video feedback generation operation for generating at least one of control signals and audio and video feedback.

At step S2050, the determined task may be performed. For example, in case of the external service, the selected service server receives the generated instruction message, analyzes the received instruction message, and performs tasks associated with the determined service based on the analysis result independently or in cooperation with legacy systems for providing the request services, such as ordering pizzas, checking local weather, purchasing a train ticket, so forth. In case of the internal service, central server 200 may determine tasks to perform in response directly to user speech and perform the determined tasks based on interpretation and analysis result of the user speech (e.g., voice commands)

At step S2060, at least one control signal and audio and video feedback may be generated for providing a result of performing the determined task, as audio and video feedbacks. For example, the selected service server may generate result messages including audio messages and/or video data based on the result of performing the tasks and according to formats and parameters included in the registration information and transmit the generated messages to central server 200. Central server 200 receives the result messages including the audio and video messages from the service server, transmits the result messages including audio and video messages, entirely or partially to user interactive device 100, and directly or indirectly outputs the audio and video messages through at least one associated device including user interactive device 100 (e.g., speakers and displays associated with user interactive device 100). In accordance with another embodiment, service servers 300 may generate and transmit a response message to central server 200 in response to the instruction message. The response message may not include all the information including audio and video data, as a result of performing the determined task. The response message may be an ACK message in response to the instruction message, but the present embodiments are not limited thereto. Furthermore, the result message may not include audio and video messages. In this case, at least one of central server 200 and user interactive device 100 may generate audio and video message based on the information included in the result message.

In particular, in case of the external service, central server 200 may i) receive, from the selected one of external service servers 300, a resultant message including information on the result of performing tasks associated with the external service and ii) generate at least one of control signals and audio and video feedback based on the resultant message. In case of the internal service, central server 200 may i) directly collect information on a result of performing tasks associated with the internal service and ii) generate at least one of control signals and audio and video feedback based on the collected information. That is, in case of the internal service, central server 200 may dynamically and flexibly generate the audio and video feedback directly based on the user speech (e.g., interpretation and analysis of the user speech). Accordingly, in case of the internal server, the generation of audio and video feedback, task types, and conversation with a user may not be limited by external environmental factors, such as the capabilities of the external service servers. For example, when a VOD service is an internal service, central server 200 and user interactive device 100 may be able to perform all tasks associated with menus in an VOD application, such as " . . . searching action movies," and " . . . play number 3 of the action movie list . . . " and to generate audio and video feedback (e.g., answer) directly based on user speech, such as " . . . generating an action movie list", and " . . . playing the $3^{rd}$ movie in the list."

In case of the external service, types of tasks might be limited by the capabilities of the selected one of external service servers. Furthermore, in case of the external service, types of tasks or conversation with a user might be limited by at least one of task types, message formats, information in the resultant message. For example, when a VOD service is an external service, central server 200 and user interactive device 100 may not be able to perform all tasks associated with menus in an VOD application. That is, central server 200 and user interactive device 100 may open a user interface of the VOD application on display 504 in response to user speech of " . . . I want to watch a movie . . . " based on the registration information of the VOD service (e.g., external service). However, the performing of other tasks associated with menus in the VOD application may be limited to capabilities of an external service server associated with the VOD service (e.g., VOD application).

Figure 3:
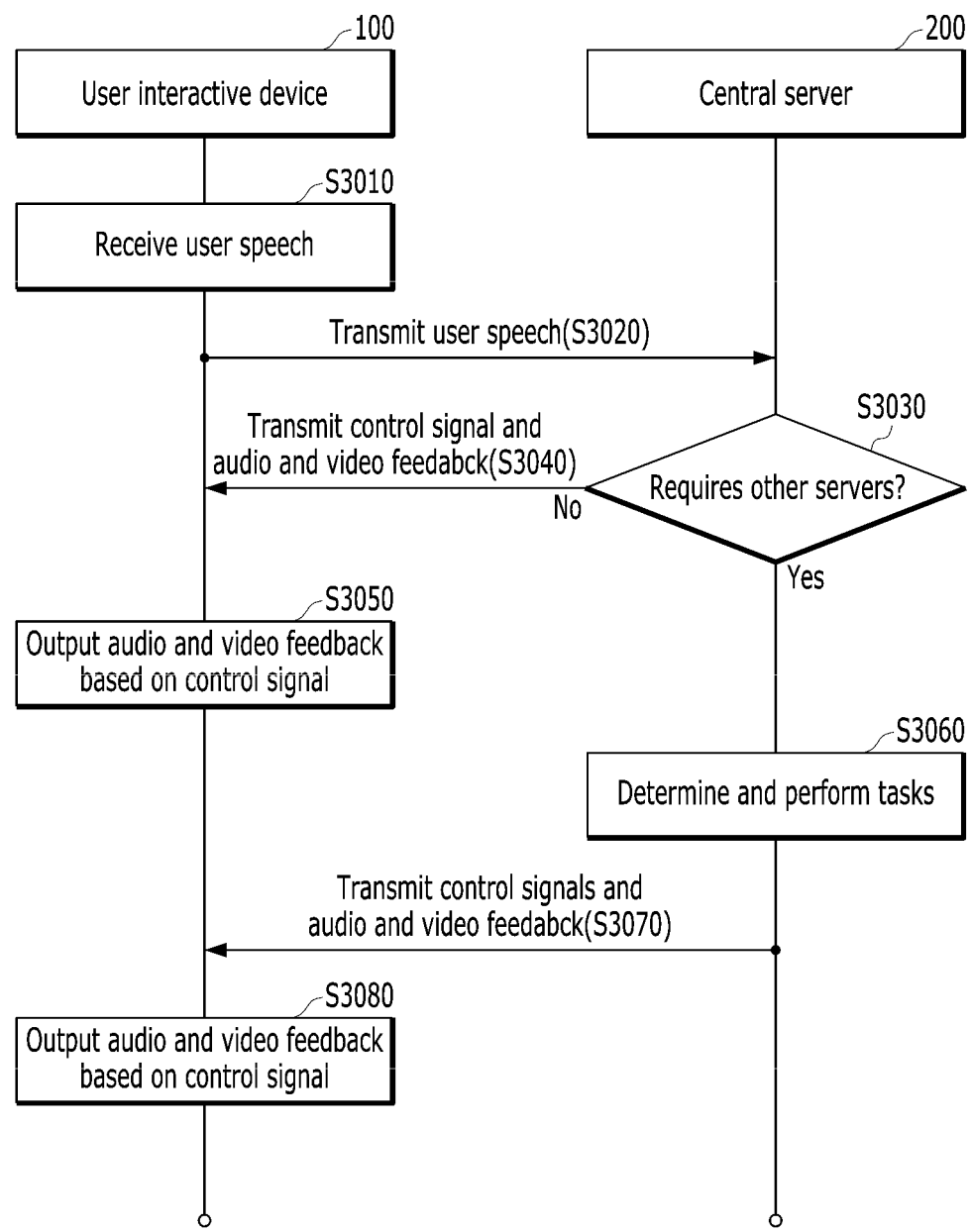
FIG. 3 illustrates operations of an artificial intelligence voice interactive system in accordance with another embodiment of the present disclosure.

Hereinafter, various exemplary operations of the artificial intelligence voice interactive system will be described with reference to FIG. 3 and FIG. 4. FIG. 3 illustrates operations of an artificial intelligence voice interactive system in accordance with another embodiment of the present disclosure. Referring to FIG. 3, user interactive device 100 receives user speech from a user at step S3010, and user interactive device 100 transmits the received user speech to central server 200 at step S3020. Central server 200 may include features such as i) a voice recognition function that recognizes user speech (e.g., voice signal) and extract at least one voice command from the user speech, ii) service management function that determines a service corresponding to the voice command, and iii) speech interpretation function that interprets and analyzes the user speech based on context information, determines intention of the user speech, and generates at least one control signal and audio and video feedback based on the interpretation and analysis results. Furthermore, central server 200 may be coupled to a set of internal servers, one for i) the voice recognition function, one for ii) search function, and the other for iii) conversation function. For convenience and ease of understanding, central server 200 is described as having the voice recognition function, the speech interpretation function, and the search function. However, the embodiments of the present disclosure are not limited thereto. Such each function of central server 200 may be implemented as an independent server, such as voice recognition server 210, speech interpretation server 230, and search server 220.

Furthermore, in accordance with another embodiment, instead of the central server 200, user interactive device 100 may directly interpret and analyze user speech, extract at least one voice command based on the interpretation and analysis results, and generate audio and video feedbacks and control signals as an answer in response to the voice command based on the interpretation and analysis results. In this case, user interactive device 100 may transmit at least one of the interpretation and analysis results, the generated control signals and the audio and video feedbacks (e.g., audio and video answer or audio and video result) to central server 200.

At step S3030, central server 200 determines whether the voice commands (e.g., a task associated with the voice command) requires cooperation with any other servers, such as service servers 300 (e.g., external task) to perform associated services or tasks. That is, central server 200 may determine whether the voice commands are related to an external service or an internal service. However, the embodiments of the present disclosure are not limited thereto. For example, user interactive device 100 may determine whether the voice command requires cooperation with any other servers, for example, whether a task (e.g., service) associated with the voice command is an internal task or an external task.

When the determined voice command does not require cooperation with any other servers (e.g., not an external task), central server 200 performs at least one of internal tasks, generate at least one control signal and audio and video feedback as results of performing the internal tasks, and transmits the generated control signals and audio and video feedback to user interactive device 100 at step S3040.

At step S3050, user interactive device 100 controls at least one device based on the control signal or outputs the audio and video feedback (e.g., voice answer to user speech) through at least one of speakers and display and controls associated devices according to the control signals.

When the voice command requires cooperation with any other servers (e.g., service server 300, when the voice commands are related to an external service), central server 200 determines at least one of services (e.g., external tasks) and service server based on results of interpreting and analyzing the user speech and the voice commands based on context information of user interactive device 100 and generate and transmit an instruction message to the selected service server to perform tasks associated with the external service at step S3060.

At step S3070, central server 200 receives a resultant message including information on results of performing the tasks associated with the external service based on the instruction message from the selected external service server, generates at least one control signal and audio and video feedback based on the resultant message, and transmits the generated control signals and audio and video feedback to user interactive device 100. In particular, central server 200 may receive information on a result of performing the external tasks by the selected external service server and generate the control signals and audio and video feedbacks based on the received information. However, the embodiments of the present disclosure are not limited thereto. In accordance with another embodiment, such an at least control signal and audio and video feedback may be generated directly by the external service server related to the determined service and transmitted from the external service server to central server 200.

At step S3080, user interactive device 100 receives the generated control signals and audio and video feedback from central server 200 and controls at least one of devices according to the control signals and outputs the audio and video feedback associated with the determined service through at least one of speakers and display.

In accordance with at least one embodiment, at the step S3080, user interactive device 100 may display video contents on a display device coupled to user interactive device 100. User interactive device 100 may perform a predetermined task (e.g., turning on/off coupled switches or lights) displaying the video contents on the display device. Furthermore, user interactive device 100 may control the reproduced (or displayed) video contents according to the received control signal or the service. User interactive device 100 may display audio and video feedback as an answer or a service corresponding to the received control signal in an overlapping manner while the video contents are displayed (e.g., reproduced) on the display. As the audio and video feedbacks (e.g., answer or a service corresponding to the received control signal), user interactive device 100 may display text messages while the video contents are displayed (e.g., reproduced) on the display. User interactive device 100 may receive a voice signal from a user while the video contents are displayed on the display. User interactive device 100 may control the video contents according to an answer extracted from the voice signal. User interactive device 100 may output at least one part corresponding to the video contents, in an audio signal provided through user interactive device 100, through a speaker coupled to the display device. Furthermore, user interactive device 100 may output at least one part corresponding to a service, in an audio signal through user interactive device 100. User interactive device 100 may output at least one part corresponding to the video contents and at least one part corresponding to the service, in an audio signal provided through user interactive device 100, through a speaker coupled to the display device.

Figure 4:
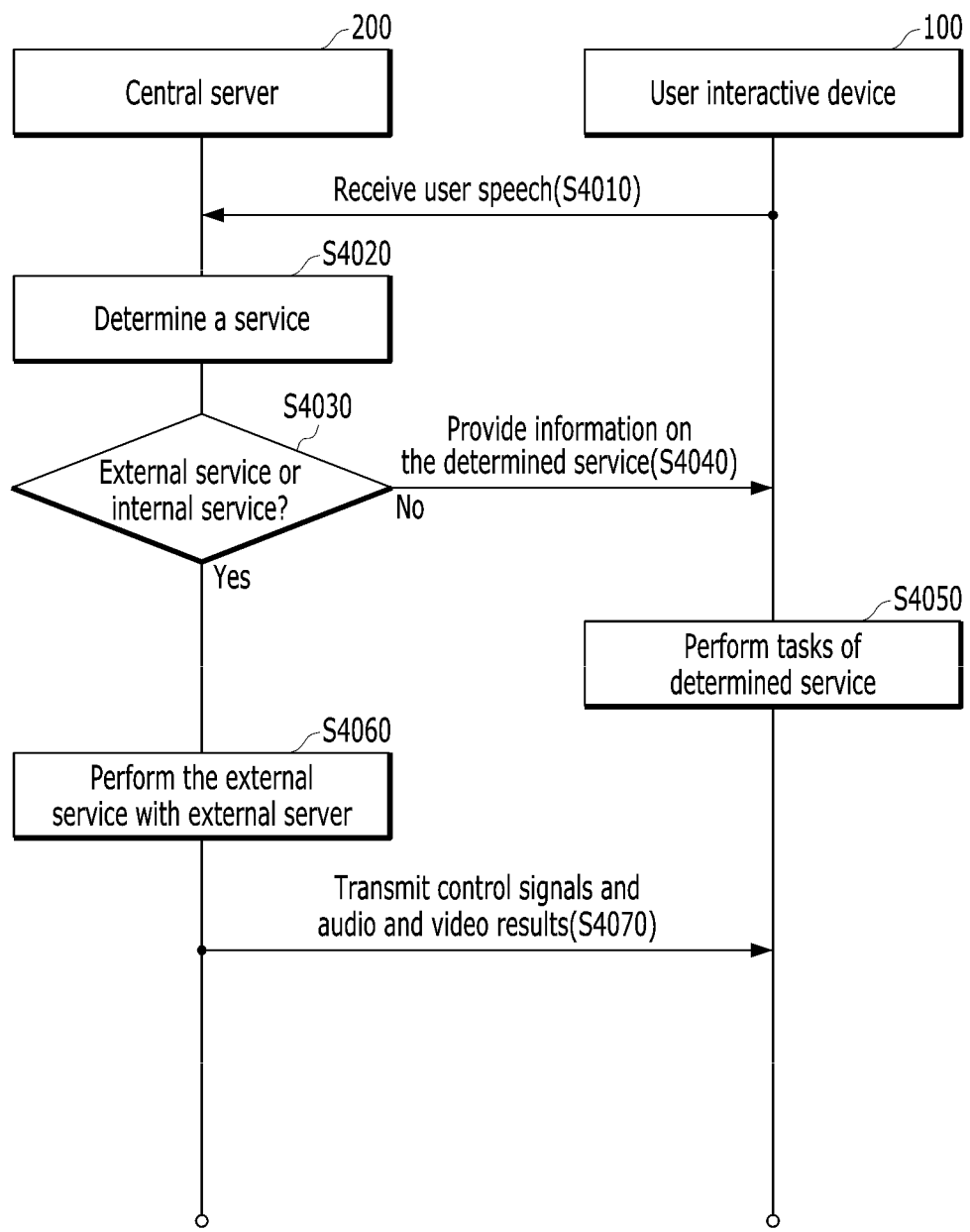
FIG. 4 illustrates an overall operation of an artificial intelligence voice interactive system in accordance with still another embodiment of the present disclosure.

FIG. 4 illustrates an overall operation of an artificial intelligence voice interactive system in accordance with still another embodiment of the present disclosure. Referring to FIG. 4, user interactive device 100 receives user speech from a user and transmits the received user speech to central server 200 at step S4010. Central server 200 determines a service (e.g., a task or an operation) associated with the received user speech at step S4020. Alternatively, without transmitting the user speech to central server 200, user interactive device 100 may directly recognize voice commands in the user speech and generate audio and video feedback as an answer in response to the recognized voice command. In this case, user interactive device 100 may transmit the recognition result and the generated audio and video feedback to central server 200. Furthermore, in this case, user interactive device 100 may directly determine a service associated thereof based on the recognition result and the answer.

At step S4030, central server 200 determines whether the determined service (e.g., determined task) is an external service (e.g., external task) that requires cooperation with at least one of service servers 300. When the determined service is not the external service (No—S4030), central server 200 provides the information on the determined service to user interactive device 100 at step S4040, and user interactive device 100 performs the determined task based on the information on the determined service at step S4050. When the determined service is the external service (Yes—S4040), central server 200 performs tasks associated with the external service in cooperation with at least one of service servers 300 at step S4060. Central server 200 receives a result of the external service or a control signal generated based on the result of the external service from selected external service server 300 and generate the result of performing the tasks (e.g., audio and video feedback and control signals) to user interactive device 100 at step S4070.

As described, user interactive device 100 may listen to speech made by a user, recognize at least one of voice commands from the speech, and transmit data of the recognized voice commands to central server 200 through a communication link. Furthermore, user interactive device 100 may receive control signals and audio and video feedback in association with the received user speech from central server 200, control at least one devices 500 based on the control signals, and outputs the received audio and video feedback through at least one of speakers and displays. Hereinafter, such user interactive device 100 will be described with reference to FIG. 5. For convenience and ease of understanding user interactive device 100 is described as a device dedicatedly designed and manufactured to listen and recognize a voice command without additional user action such as clicking or pushing a predetermined hardware button of the device or touching a predetermined virtual button displayed on a touch screen of the device. However, the embodiments of the present disclosure are not limited thereto. For example, user interactive device 100 may be any devices capable of receiving, recording a voice command, and transmitting data of the voice command to the other entities. For example, as described, and not limited to, user interactive device 100 may be a smart phone, a tablet, a laptop computer, and likes.

Figure 5:
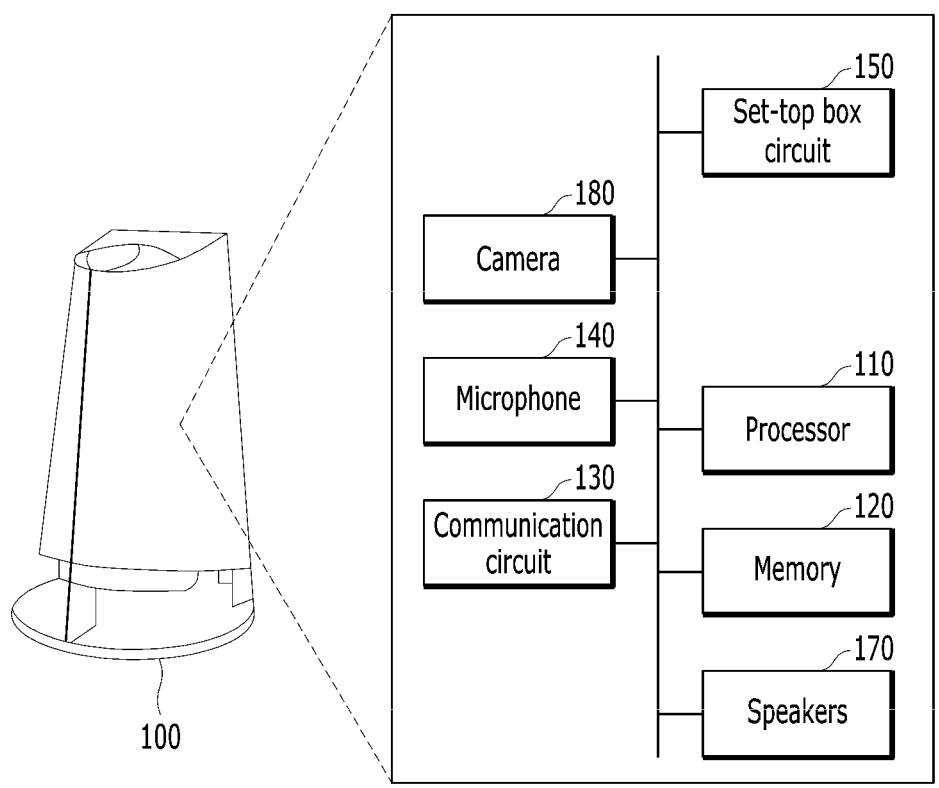
FIG. 5 illustrates a user interactive device in accordance with at least one embodiment.

FIG. 5 illustrates a user interactive device in accordance with at least one embodiment. Referring to FIG. 5, user interactive device 100 may include processor 110, memory 120, communication circuit 130, at least one microphone 140, set-top box circuit 150, camera 160, and at least one speaker 170.

Processor 110 may perform or control overall operation of user interactive device 100. For example, processor 110 may be a central processing circuitry that controls constituent elements (e.g., memory, communication circuit, etc.) of user interactive device 100 and/or performs a variety of operations (or functions) of user interactive device 100. Particularly, processor 110 may perform operations of listening user speech, recognizing at least one voice command, transmitting the user speech, the recognized voice command, and context information to at least one of central server 200, internal service servers 210 to 230, and external service servers 300, receiving at least one of control signals and audio and video feedbacks from at least one of central server 200, internal service servers 210 to 230, and external service servers 300, controlling at least one of devices according to the control signals and outputting the audio and video feedbacks.

Memory 120 may store a variety of information. For example, memory 120 may store task information registered by processor 110. Memory 120 may further store personal information of a user, such as a name, an address, a telephone number. Furthermore, memory 120 may further include any software programs and related data. Memory 120 may further store an operation system data, applications, and related data, received from other entities (e.g., user interactive devices, other servers) through a variety of communication media (e.g., communication networks). In accordance with at least one embodiment, memory 120 may store information on display setting determined for display unit of central server 200. Memory 1200 may include at least one of an internal memory and an external memory according to embodiments. For example, memory 120 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Communication circuit 130 may communicate with at least one of central server 200, internal service servers 210 to 230, and external service servers 300 through a network 600. Communication circuit 130 may transmit messages and information (e.g., to at least one of central server 200, internal service servers 210 to 230, and the external service server 300 and receives at least one of control signals and audio and video feedbacks (e.g., answer or a result of performing the task).

Communication circuit 130 may include at least one module (or at least one circuit) for communicating with other entities through a communication network (e.g., network 600). Herein, the communication network (e.g., network 600) may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

In accordance with at least one embodiment, user interactive device 100 may include at least one microphone 140 configured to receive, detect, and record user speech spoken from at least one user around user interactive device 100. At least one microphone 140 may store received user speech in memory 120 under control of processor 110.

User interactive device 100 may include set-top box circuit 150 for providing a TV tuning service, a video on demand (VOD) service, and controlling a display coupled to user interactive device 100 through a predetermined communication link in response to control of processor 110. In particular, set-top box circuit 150 may directly receive signals from at least one broadcasting station and processes the received signals into contents in a form displayed on a display (e.g., including a TV-tuner input and displays output to a display). Furthermore, set-top box circuit 150 may be controlled directly in response to a voice command (e.g., user speech). In accordance with at least one embodiment, user interactive device 100 may provide such a TV tuning service, VOD service, and a display controlling service as an internal service in cooperation with central server 200.

Camera 160 may be attachable/detachable to/from a main body of user interactive device 100. Camera 160 may include a camera operation status indication light (LED), a home-cam server connection status indication light (LED), and a camera interface to a main body of user interactive device 100.

Speaker 170 may output audio feedbacks to user in response to control of processor 120. Furthermore, at least one speaker 170 may output other audio data, such as music or sound effect in response to a voice command.

In accordance with another embodiment, A telephony circuit may be included in user interactive device 100. Such a telephony circuit may be a circuit for providing a voice call service and a video call service. In particular, the telephony circuit may perform operations related to the voice call service and the video call service in cooperation with communication circuit 130 under control of processor 120. That is, the telephony circuit may be referred to as a telecommunication controller (e.g., telephony circuit) for making a phone call or a video call to a predetermined person through a telecommunication network (e.g., 3GPP network) and an Internet network (e.g., data network).

In addition, although it is not shown in FIG. 5, user interactive device 100 may include a power button (e.g., a power status indication light, a remote controller receipt LED), a IR receiving port, a mic, a volume control button, an Internet connection status indication light, and a Wi-Fi connection status indication light, a RJ-45 Ethernet port, a HDMI output port, a S/PDIF output port, a power adaptor terminal, a power on/off switch, a USB port, a Micro SD slot, a Bluetooth pairing button, a WPT privacy protection button, a camera interface, a service status indication light (e.g., emotion LED). User interactive device 100 may include a Bluetooth communication circuit, a speaker, a Wi-Fi client.

In accordance with at least one embodiment, user interactive device 100 may perform various operations. For example, user interactive device 100 may recognize user speech and identify a user that speaks around user interactive device 100. User interactive device 100 may provide audio and video feedbacks to user speech. Such audio and video feedback may be provided with various characters and texts through display 504 coupled to user interactive device 100. User interactive device 100 may perform artificial intelligent conversation with a user. User interactive device 100 may enable a user to set an address book, an alarm, a schedule, a gallery, and etc. in response to user speech. User interactive device 100 may control and monitor home IoT devices 500 in response to user speech. User interactive device 100 may provide a music service, a TV based on voice and video call service, an OTV service, and a voice recognition service in response to user speech.

User interactive device 100 may be controlled through a companion application in accordance with at least one embodiment. Such a companion application may be installed in a computer, a mobile phone, and a portable device and allow a user to setup and control user interactive device 100. For example, i) through the companion application, a user may obtain link information for accessing user interactive device 100 and use a pairing function of user interactive device 100 to pair the user interactive device 100 with a desired device. ii) Through the companion application, a user may allow to share information (e.g., music, video, and so forth) of other applications installed in other devices (e.g., smart phone, computer, and . . . ). iii) Through the companion application, user may allow to link user interactive device 200 with other applications installed in other devices for performing services associated with the other application through user interactive device 100. That is, the companion application may be an interface between user interactive device 100 and other associated applications or devices.

Such a companion application may be installed a plurality of devices associated with user interactive device 100 (e.g., coupled to user interactive device 100, interacted with user interactive device 100, in cooperation with user interactive device 100). User interactive device 100 may provide a customized service to a plurality of users in cooperation with a plurality of companion applications.

For example, each of the plurality of devices each installed with the companion application may control user interactive device 100 through the companion application. For example, the plurality of devices includes a laptop computer, a desktop computer, a smart phone, a table PC, a wearable device, and devices equipped with at least one memory, at least one processor, and a communication circuit capable of communication using Bluetooth low energy (BLE), NFC, RFID, ultrasonic, infrared, Wi-Fi, and Li-Fi.

For example, a first user terminal is installed with a first companion application, and a music streaming service may be provided through user interactive device 100 to a first user using the first companion application of the first user terminal. A second user terminal is installed with a second companion application, and a weather service may be provided through user interactive device 100 to a second user using the second companion application of the second user terminal.

User interactive device 100 may be coupled to a plurality of IoT devices and associated supplementary devices (e.g., remote controller or a hub device) and control the plurality of IoT devices (e.g., provide a service of each IoT device) according to a voice command inputted to user interactive device 100.

User interactive device 100 may be installed with a plurality of applications (e.g., address app, gallery app, display control app, IoT app) each controlling a corresponding IoT device according to a voice signal (e.g., video signal). For example, user interactive device 100 receives a voice command of "turning a channel to 11," user interactive device 100 controls a corresponding device (e.g., TV) through a first launcher application (e.g., display device control app).

User interactive device 100 may receive a video call request signal (e.g., a voice signal, a predetermined gesture, or a predetermined image to invoke the video call), generate a video call connection signal through a video call application, and provide a video call service in cooperation with a display device.

User interactive device 100 may receive a voice signal (user speech) from a user and transmit the voice signal to voice recognition server 210. User interactive device 100 may receive information on a service associated with the voice signal from central server 200, wherein the service is determined by central server 200 based on analysis result of speech interpretation server 230.

When user interactive device 100 receives information on the determined service from central server 200, user interactive device 100 controls video contents being displayed through display device according to the received service. In particular, when user interactive device 100 receives an instruction message to control a display connected to user interactive device 100 from central server 200, user interactive device 100 controls video contents being displayed on display device according to the instruction message. User interactive device 100 may display a voice command or an answer (e.g., video feedback) on a display device connected to user interactive device 100 while the display device reproduces and displays predetermined video contents.

Figure 6:
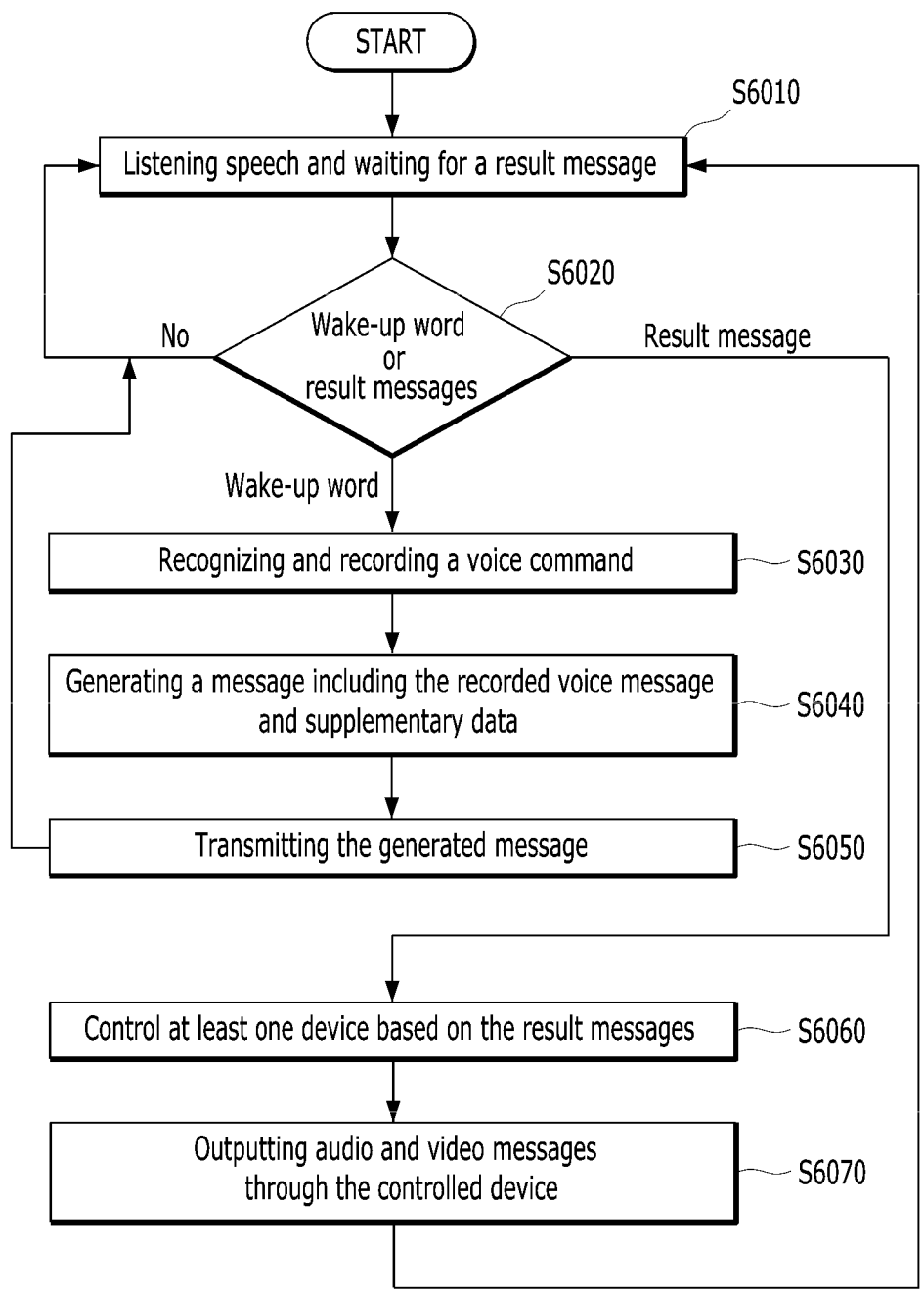
FIG. 6 is a flowchart illustrating operation of a user interactive device in accordance with at least one embodiment.

As described, user interactive device 100 may perform various operations in response to user speech. Hereinafter, such an operation of user interactive device 100 will be described. FIG. 6 is a flowchart illustrating operation of a user interactive device in accordance with at least one embodiment.

Referring to FIG. 6, user interactive device 100 may listen to speech made around user interactive device 100 at step S6010. For example, user interactive device 100 is installed or deployed at a predetermined location (e.g., living room), powered on, connected to communication network 600 (e.g., Internet), and registered at central server 200. Such operations may be performed through a companion application installed at the other device, such as a smart phone. For another example, user interactive device 100 may be carried with a user. Further, user interactive device 100 may have an interface to enable a user to directly perform setups and register it at central server 200. After powered on, setup, and registration, user interactive device 100 always listens to sound or speech. However, the embodiments of the present disclosure are not limited thereto. For another embodiment, user interactive device 100 may listen to or receive speech (e.g., voice command) upon generation of a predetermined event. The predetermined event may include clicking, pushing, or touching a predetermine button of user interactive device 100. The predetermined button may be a virtual icon displayed on a touch screen (not shown) of user interactive device 100.

In addition, user interactive device 100 may wait for a result message from at least one of central server 200, internal service servers 210 to 230, external service servers 300, or other entities including legacy systems connected through communication network 600 at step S6010. For example, after performing a task associated with a voice command of a user, user interactive device 100 receives at least one of audio messages or video messages as a result of performing the task and outputs the audio and/or video message through at least one of devices, such as speakers equipped in user interactive device 100 and a display connected to user interactive device 100 or central server 200.

At step S6020, user interactive device 100 may determine whether a wake-up word is included in the speech or whether a result message is received. That is, user interactive device 100 performs an operation for receiving and recording voice commands (e.g., user speech) (e.g., voice command receiving operation) upon generation of a predetermined event. Such a predetermined event may include recognition of a wake-up word. The wake-up word may be a word (e.g., or sentence) designated as a wake-up word for initiating an artificial intelligence voice interaction task. As a first operation of the artificial intelligence voice interaction task, user interactive device 100 performs the voice command receiving operation. For example, when user interactive device 100 recognizes a wake-up word while listening to speech, user interactive device 100 starts recording speech after the wake-up word for predetermined duration (e.g., 30 seconds), When user interactive device 100 recognizes a wake-up word (Yes—S6020), user interactive device 100 may recognize speech of a certain period time after the wake-up word as a voice command and records the recognized voice command in a predetermined format (e.g., mpeg or way) at step S6030. For another example, user interactive device 100 may recognize speech right after the wake-up word till no sound for 5 seconds.

At step S6040, user interactive device 100 may generate a message including the recorded voice command and supplementary information (e.g., context of user interactive device 100). At step S6050, user interactive device 100 may transmits the generated message to central server 200 through communication network 600.

Referring back to step S6020, user interactive device 100 may receive a resultant message directly or indirectly from at least one of central server 200, internal service servers 210 to 230, and external service servers 300. In this case (resultant message—S6020), user interactive device 100 may control at least one device based on the result message at step S6060 and output video or audio messages through the controlled at least one device at step S6070. In accordance with another embodiment, video and audio messages (e.g., audio and video feedbacks) may be generated by user interactive device 100 based on information included in the result message received from at least one of central server 200, selected internal service servers 210 to 230, and selected service server 300. That is, user interactive device 200 may receive the result message from the selected service server, generate audio and video message based on information included in the result message, and outputting the generated audio and video message through at least one of associated devices.

As described, central server 200 may receive at least one voice command extracted from user speech, analysis the at least one voice command, select a service server associated with the task of the at least one voice command based on the analysis result, perform the task by controlling the selected service server, and provide a result of performing task to user interactive device in accordance with at least one embodiment.

Figure 7:
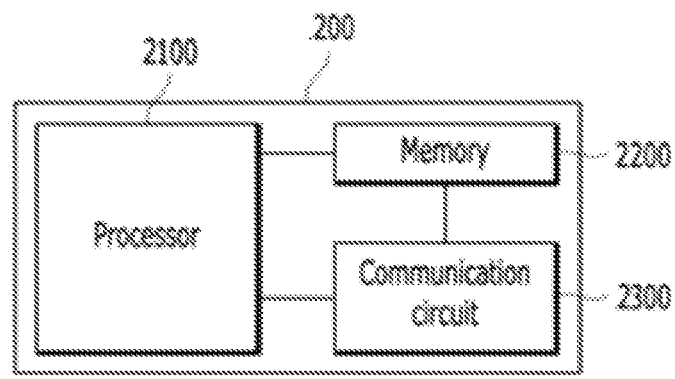
FIG. 7 illustrates a central server in accordance with at least one embodiment of the present disclosure.

FIG. 7 illustrates a central server in accordance with at least one embodiment of the present disclosure.

Referring to FIG. 7, central server 200 may be a computing system capable of receiving digital data from other entities through a predetermined communication network, transmitting digital data to other entities through a predetermined communication network, processing the digital data to perform operations for providing various services by cooperating with service servers and legacy systems, and storing digital data in a memory. For, central server 200 includes communication circuit 2300, processor 2100, and memory 2200. At least one of communication circuit 2300, processor 2100, and memory 2200 may be implemented with at least one processor and controlled according to programming codes stored in memory 2200.

Communication circuit 2300 may communicate with user interactive device 100, other internal service servers 210 to 230 and external service servers 300 through a network 600. Communication circuit 2300 may receive data corresponding to a voice command of a user from user interactive device 100. Communication circuit 2300 may include at least one module (or at least one circuit) for communicating with other entities (e.g., user interactive device 100, internal service servers 210 to 230, service servers 300, etc.) through a communication network (e.g., network 600). Herein, the communication network (e.g., network 600) may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

Processor 1100 may perform or control overall operation of central server 200. For example, processor 1100 may be a central processing circuitry that controls constituent elements (e.g., memory, communication circuit, etc.) of central server 200 and/or performs a variety of operations (or functions) of central server 200. Particularly, processor 1100 may perform operations of registering tasks of a plurality of service servers 300, analyzing the received data, and selecting at least one of internal service server 210 to 230 and external service servers 300 to perform a task according to the voice command from the user. Processor 1100 may directly perform a task included in the voice command without selecting and controlling a service server to perform a task.

Communication circuit 1300 may transmit an instruction message to the selected service server 300 and receives a result of performing the task from the selected service server 300. Communication circuit 1300 may also deliver the received result to user interactive device 100.

Memory 1200 may store a variety of information. For example, memory 1200 may store task information registered by processor 1100. Memory 1200 may further store personal information of a user, such as a name, an address, a telephone number. Furthermore, memory 1200 may further include any software programs and related data. Memory 1200 may further store an operation system data, applications, and related data, received from other entities (e.g., user interactive devices, other servers) through a variety of communication media (e.g., communication networks). In accordance with at least one embodiment, memory 1200 may store information on display setting determined for display unit of central server 200. Memory 1200 may include at least one of an internal memory and an external memory according to embodiments. For example, memory 1200 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Central server 200 may include features such as i) a voice recognition function that recognizes user speech (e.g., voice signal) and extract at least one voice command from the user speech, ii) service management function that determine a service (e.g., tasks) corresponding to the voice command, and iii) speech interpretation function that interprets and analyzes the user speech based on context information, determines intention of the user speech, and generates at least one control signal and audio and video feedback based on the interpretation and analysis results. Furthermore, central server 200 may be coupled to a set of internal servers, one for i) the voice recognition function, one for ii) search function, and the other for iii) conversation function.

For example, central server 200 may be coupled to, not limited to, speech recognition server 210, search server 220, and speech interpretation server 230 for providing internal services by performing internal tasks and dynamically generating control signals and audio and video feedback in response to the voice command in accordance with at least one embodiment. As described, the audio and video feedback may include an audio based service, a video based service, a user interface (UI) based service, voice commands, sound effects, graphic user interfaces, characters, texts, and animated messages, and so forth.

The audio based service may be a service provided based on audio data, such as playing back a radio or a music, reading an electric book, answering with a voice, and so forth. The video based service may be a service provided based on video data, such as reproducing images, playing back movies, music videos, and playing back TV shows, answering with video data, and so forth. The UI based service may be a service provided based on a graphic user interface, such as displaying images and information within a graphic user interface, providing a predetermined graphic user interface for enabling user to control and set at least one of user interactive device 100, central server 200, voice recognition server 210, search server 220, and speech interpretation server 230.

For example, in cooperation with user interactive device 100, central server 200, voice recognition server 210, search server 220, and speech interpretation server 230, i) a voice command or a task result may be analyzed to generate at least one of audio feedback and video feedback, ii) determine a service mode (e.g., audio service mode, video based service mode, and UI based service mode), and selectively provide the generated audio feedback and video feedback according to a previous service mode and a current service mode; ii) a voice command or a task result may be determined to detect an emotion type, an action type, and a sentence type thereof, a facial expression and an action of a character may be selected based on the emotion type, the action type and the sentence type, a character may be generated based on the selected facial expression and action, and the generated character may be provided; and iii) a provided character may be analyzed to detect an emotion type, an action type, and a sentence type thereof, ii) information on a facial expression and an action may be collected with the detected types, and iii) the collected information may be updated at a character database.

Voice recognition server 210, search server 220, and speech interpretation server 230 may be a computing system including at least one communication circuit for communication with other entities through a communication network, at least one memory for storing necessary information for performing a designated operation, and at least one processor for controlling constituent elements thereof and performing the designated operation and communication with other entities.

For example, voice recognition server 210 may perform operations to receive speech data (e.g., voice command) from user interactive device 100 or central server 200 and convert the received speech data to text data in order to recognize a voice command.

Speech interpretation server 230 may analyze a voice command included in the user speech, based on the text data from speech recognition server 210 and collect i) information on a task result from central server 200 or service server 300, ii) state information of user interactive device 100, and iii) context information associated with a user and related environment. Based on the collected information and the analysis result, speech interpretation server 230 may deduce artificial intelligent answer and generate audio data for voice answers in response to the voice command. Speech interpretation server 230 may request service server 300 to collect or obtain artificial intelligent answer in response to the voice command.

Voice recognition server 210 may receive user speech from user interactive device 100, extract at least one voice command from the user speech, and transmit the extracted voice commands and/or user speech to central server 200. For example, voice recognition server 210 converts the user speech to texts, compares voice commands (e.g., in a voice command list) with the texts, and selects at least one voice command having a similarity higher than a predetermined threshold.

Central server 200 may receive at least one voice command from voice recognition server 210, analyzes the received voice commands, determines a service (e.g., a task) based on the analysis result, and transmit information on the determined service to user interactive device 100.

In particular, central server 200 may determine whether additional analysis (e.g., second analysis) is required on the received voice commands from voice recognition server 210. When the additional analysis is required, central server 200 transmit the voice commands and user speech to speech interpretation server 230.

When the additional analysis is required, central server 200 may collect context of user interactive device 100 and additionally transmit the collected context to speech interpretation server 230. Herein, the context may be information for i) deducing missing information from a voice command, ii) analyzing or interpreting an intention of user speech in association with the voice command, and iii) generating an answer to a command voice. For example, the context may include user preference information of user interactive device 100, voice command history, usage frequency of each function of user interactive device 100, user feedback information of each service, usage period of user interactive device 100, and circumstance information of user interactive device 100. When speech interpretation server 230 requests context of user interactive device 100, central server 200 may collect context of user interactive device 100 and transmit the collected context to Speech interpretation server 230.

Central server 200 may map each service to a corresponding inquiry template and manages inquiry templates. For example, central server 200 i) maps a contact search service to an address template and manages the address inquiry template with the contact search service, ii) maps a media search/suggestion service to a media inquiry template and manages the media template with the media search/suggestion service, iii) maps a weather service to a weather inquiry template and manages the weather inquiry template with the weather service, and iv) maps an IoT control service to an IoT inquiry template and manages the IoT inquiry template with the IoT service.

When the additional analysis is not required, central server 200 may analyze voice commands, selects a service corresponding to the voice commands based on the analysis result, and transmit information on the selected service to user interactive device 100.

Central server 200 determines whether a target service requires at least one of service servers 300 based on the target service mapped with an inquiry template. When a service of a voice command requires at least one external service server 300, central server 200 requests a corresponding service server 300 to provide a service and provide the service to user interactive device 100 in cooperation with the service server 300. For example, in case of a money exchange rate search inquiry, central server 200 requests a first service server 300 to search a target money exchange rate and transmits text information of the search result (e.g., target money exchange rate) to user interactive device 100.

When a service of a voice command does not require service server 300, central server 200 may provide a target service to user interactive device 100 through a corresponding service module among a plurality of internal service modules (e.g., internal service servers 210 to 230). The internal service module is a module providing a target service mapped to each inquiry template.

For example, in case of a time related command (e.g., "what time is it now"), central server 200 performs an operation for detecting a current time (e.g., "a current time is 5:23 PM") through a first internal module and provides the operation result to user interactive device 100. In case of a schedule, central server 200 performs an operation for detecting a current schedule (e.g., appointment, meeting schedule, so forth) through a second internal module and provides the operation result to user interactive device 100.

Central server 200 may transmit an instruction message to user interactive device 100 to control display device 504 coupled to user interactive device 100. For example, central server 200 may transmit an instruction message to user interactive device 100 for interrupting video contents being reproduced and displayed on display unit 504 and displaying video of a service provided to user interactive device 100 on display unit 504. For another example, central server 200 may transmit an instruction message for displaying texts or answer on display unit 504 in an overlapping manner with video contents being reproduced and displayed on display unit 540.

Speech interpretation server 230 may perform an operation for interpreting and analyzing the user speech to support analysis on voice commands of central server 200 in cooperation with central server 200. In particular, speech interpretation server 230 may receive a voice command (e.g., user speech) with context information of user interactive device 100 from central server 200 and may be requested to interpret user speech based on the voice command and the context information.

When speech interpretation server 230 receives voice commands for interpretation from central server 200, speech interpretation server 230 requests context information of user interactive device 100 to central server 200 and may receive the context information from central server 200 in response to the request. Speech interpretation server 230 may perform at least one of deducing or compensating a voice command, interpreting a voice command, analyzing an intention, and generating an answer based on the context information of user interactive device 100. Speech interpretation server 230 may interpret voice commands based on the context information of user interactive device 100 and analyze an intention of a user for the voice command.

In particular, speech interpretation server 230 deduces or compensates omitted information from the voice command based on user preference information in the context information, interprets user speech corresponding to the voice command, and analyzes an intention of a user. For example, the user preference information may include a residence address, an office address, preferred video contents (e.g., News or music). That is, when speech interpretation server 230 receives user speech without a place for a weather inquiry voice command, speech interpretation server 230 may interpret the weather inquiry voice command with one of places in the user preference information, such as a residence address or an office address.

Speech interpretation server 230 may analyze intention of voice commands or user speech based on previous voice commands included in history information of the context information. For example, if a voice command history has only weather-related voice commands, and if a current voice command includes on a predetermined date (e.g., tomorrow), speech interpretation server 230 may interpret the current voice command as a weather-related voice command for the predetermined date (e.g., what is weather like tomorrow?)

Speech interpretation server 230 may analyze intention of voice commands by assigning and controlling a weight of each function according to frequencies of using each function based on context information of user interactive device 100.

Speech interpretation server 230 may deduce answers (e.g., audio and video feedbacks) of voice commands by controlling a weight of each function, which can be provided according to a user answer pattern included in user feedback information.

Speech interpretation server 230 may deduce an answer of a pattern different from a previous answer when speech interpretation server 230 determines that the same voice command is repeated based on a voice command history. For example, when the same voice command is repeated, speech interpretation server 230 may deduce an answer to question an intention of a voice command, such as "why you keep asking the same question?"). Speech interpretation server 230 may generate answers in consideration of a system familiarity in a usage period. Speech interpretation server 230 may generate a simple answer according to a skill-level of user interactive device 100.

Speech interpretation server 230 may interpret user speech (e.g., voice commands) based on the context information and a service being currently provided through user interactive device 100. Herein, the context information includes a function and a status of the service being currently provided and user information of user interactive device 100.

For example, when a user speaks a predetermined number while a TV channel selection user interface (UI) is displayed on a display 150, speech interpretation server 230 interprets the predetermined number as "change a channel to the predetermined number" or "select the predetermined number." For another example, when a voice command including "next" is received from a user while the user uses a radio service (e.g., music service), speech interpretation server 230 may interpret the voice command "next" as "change a current radio station to a next preset radio station" or "play a next song." As described, speech interpretation server 230 interprets user speech of a voice command received from central server 200 based on context information of user interactive device 100 and transmits the interpretation result to central server 200.

Central server 200 determines a service corresponding to the interpretation result and transmits information on the determined service to user interactive device 100. Central server 200 determines a service corresponding to the interpretation result in cooperation with service server 300 or internal modules, and transmits information on the determined service to user interactive device 100. Central server 200 may generate an answer (e.g., audio and video feedback) in response to voice commands as a voice recognition result of the voice commands based on the interpretation result and transmits a voice command and an answer (e.g., audio and video feedback) to user interactive device 100.

User interactive device 100 may receive information on a determined service from central server 200 in cooperation of service servers 300 and internal service modules of central server 200.

The voice interactive artificial intelligent system may be implemented as one server with multiple processing modules each performing operations corresponding to a conversation server, a voice recognition server, a service management server, a search server, and external service servers.

Figure 8:
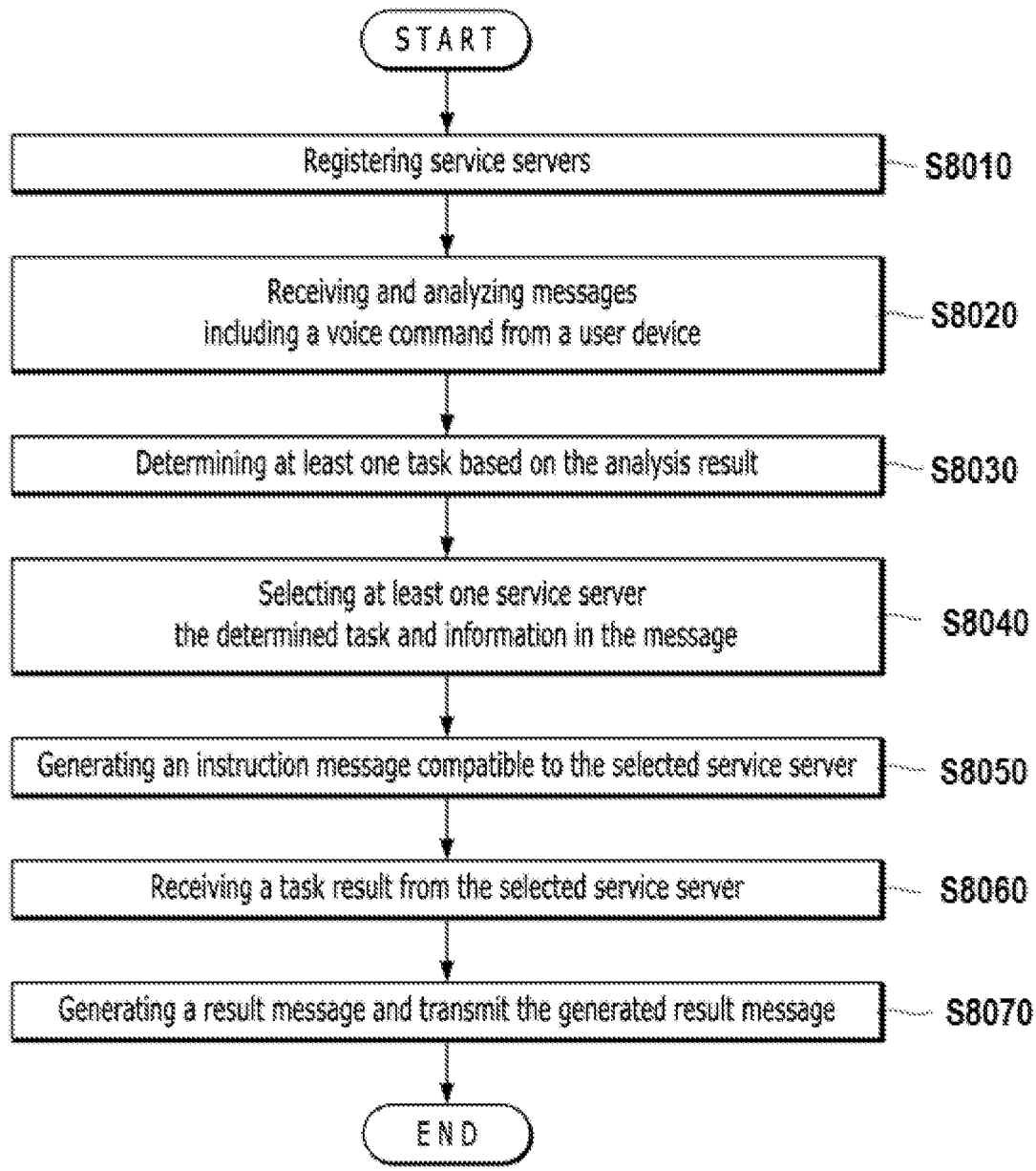
FIG. 8 is a flowchart illustrating overall operation of a central server in accordance with at least one embodiment.

FIG. 8 is a flowchart illustrating overall operation of a central server in accordance with at least one embodiment. Referring to FIG. 8, central server 200 may perform operations for registrations of each service server 300 at step S8010. For example, central server 200 may perform a registration operation upon generation of predetermined events. The predetermined events may include i) receiving a registration request from at least one of service servers 300, ii) receiving a registration request from a user of a user interactive device through smart phone 400 to register at least one service servers 300 posted at a companion app a corresponding web-site, iii) collecting registration information from service servers 300 at a predetermined interval or regularly, and iv) transmitting an initiation message to a corresponding service server to transmit registration information to central server 200. For example, central server 200 may receive a registration request from at least one of a user, a service provider, a system designer, a system operator, and likes. In response to such registration request, central server 200 may collect and store information on tasks that each service server can perform. In particular, central server 200 may receive a registration request from a user (through a companion application installed in a user equipment (e.g., smart phone 400)) or directly from a service provider of at least one of service server 300 upon generation of a predetermined event. The registration request may include registration information of a requested service server, such as identification, a task type, a service identification words (e.g., service initiation word, service initiation sentence, sentence pattern, and keyword), address, instruction message format, and likes. In response to such a request, central server 200 may store registration information of the requested service server. In order to register the requested service server and store the registration information, a plurality of service server 300 may additionally transmit the registration information to central server 200 through network 600 after requesting the registration. Furthermore, after the registration, a plurality of registered service servers 300 may regularly transmit updated registration information to central server 200.

Such registration may be performed in various manners. The registration of operation may be initiated and performed upon generation of predetermined events. the predetermined event includes i) receiving a request message from at least one of the plurality of service servers, ii) receiving a request message from a user of the user interactive device, iii) requesting the plurality of service servers to transmit registration information, and iv) regularly collecting the registration information from the plurality of service servers. For example, central server 200 may regularly collect information on service servers 300, such as what type of task each service server can perform and provide a corresponding service, essential information for performing tasks, which will be required to a user to collect for performing a corresponding task, and instruction and result message formats for exchanging instruction message and results message between service servers 300 and central server 200 including user interactive device 100. After regularly collecting the registration information of the service servers, central server 200 may publish the collected registration information of the service servers on a predetermined website or provide the collected registration information to users through companion apps. A user may select one of the registered service servers and activate tasks related to the selected service servers. However, the embodiments of the present disclosure are not limited thereto. As described, upon the registration of service servers 300, central server 200 receives information for performing tasks of each service server and stores the received information as the registration information.

Central server 200 receives data corresponding to a voice command of a user from user interactive device 100 and analyzes the received data at step S8020. The data may include speech data (e.g., voice data) or text data corresponding to the voice command. The data may be i) binary data in a certain format transferrable to third entities through a communication network, ii) audio data generated by recording voice command in a certain audio format, and iii) processed data generated by performing a speech to text process and interpreting the user speech to determine a voice command therein. Central server 200 analyzes the received data, for example, performing a parsing operation, comparing each token with keywords of each registered service servers.

At step S8030, central server 200 determines at least one task included in the received data based on the analysis results. That is, central server 200 may perform a predetermined parsing operation to separate each word in the data. That is, central server 200 may parse the received data, extract unit tokens of each word, and tag necessary meta information. Central server 200 may compare each unit token with at least one of a service initiation word, a service initiation sentence, a sentence pattern, and a keyword and determine a service server based on the comparison result. Based on the analysis result, central server 200 determines a service or a task included in the voice command.

At step S8040, central server 200 selects at least one of internal service servers 210 to 230 and external service servers 300 which can perform the determined service or tasks according to a selection policy (e.g., a selection priority and a selection order), based on comparison result (e.g., a service initiation word, a service initiation sentence, a sentence pattern, or a keyword), included in the analyzed data.

For example, when the data of voice command includes one of a service initiation word and service initiation sentence, central server 200 selects a service server mapped to the service initiation word included in the voice command. For another example, when the data of voice command includes at least one of a sentence pattern and a keyword, central server 200 selects a service server mapped to the sentence pattern or the keyword.

When central server 200 selects at least one of service servers 300, central server 200 may apply at least one of a selection order and a selection priority. The selection order denotes an order of server identification words to be considered to select a service server. For example, the selection order may be an order of a service initiation word, a service initiation sentence, a sentence pattern, and a keyword. When such a selection order is applied, central server 200 selects a service server matched with the service initiation word first. Secondly, central server 200 selects a service server matched with a service initiation sentence. Third, central server 200 selects a service server matched with a sentence pattern. Lastly, central server 200 selects a service server matched with a keyword. For another example, i) if a voice command is related to one task, ii) if the voice command includes a service initiation word mapped to one service server A, and iii) if the voice command also includes a service initiation sentence mapped to the other service server B, central server 200 selects the one service server A mapped to the service initiation word.

At step S8050, central server 200 generates and transmits an instruction message to the selected service server. For example, after central server 200 selects a service server, central server 200 may generate an instruction message and transmit the generated instruction message to the selected service server. Central server 200 may determine i) a type of a task, ii) information to be included in the task instruction, such as voice command itself or not according to the task type, iii) a format of an instruction message, iv) a destination, and v) a format of a result to be received. In particular, central server 200 may generate an instruction message to include i) information on a determined task to perform, ii) information of a voice command received from user interactive device 100, iii) information on a result to be returned (such as a format (audio or visual)), iv) information on a user who requested the questions. That is, central server 200 may generate an instruction message compatible to the selected service server in accordance with at least one embodiment. Accordingly, the selected service server can perform an operation based on information included in the instruction message and return a result to a desired entity based on the information included in the instruction message.

At step S8060, central server 200 receives a task result message including information on a result of performing the task from the service server. The task result message may include various contents including control data, text data, voice data, moving image data, and webpage data. In particular, central server 200 may receive a result message from a service server after transmitting a task instruction.

At step S8070, central server 200 generates a result control message and transmits the result control message. For example, central server 200 may determine whether the result message is transmitted to the user interactive device 100 or other entities. Then, central server 200 may transmit the result message to the user interactive device 100 and the other entities in order to play an audio result and display a video result through the other entities (such as a TV, a smart phone, or a table). Based on such determination, central server 200 generates a result control message and transmits the message to the user interactive device and associated other device.

User interactive device 100 may receive the result control message and provide the result of performing the task by controlling at least one of devices (e.g., speaker and display) and outputting audio data and video data included in the received result through the controlled devices. For example, when a user asked for the weather, the task result may include contents representing weather information. When a user asked for stock news, the task result may include information on stock news.

As described above, the artificial intelligence voice interactive system may provide various services to a user by cooperating at least one of internal service server 210 to 230, central server 200, and external service servers 300 without modifying all the legacy systems. In particular, the various services may be provided to a user by i) selecting one of service servers 300 to perform a task based on data corresponding to a voice command of a user, and ii) transmitting a result of performing the task from the selected service server 300 to user interactive device 100.

As described, central server 200 may receive data from user interactive device 100 and analyze the data, determine at least one of services (or tasks) included in the data, and select at least one of service servers to perform the determined service or task.

Figure 9:
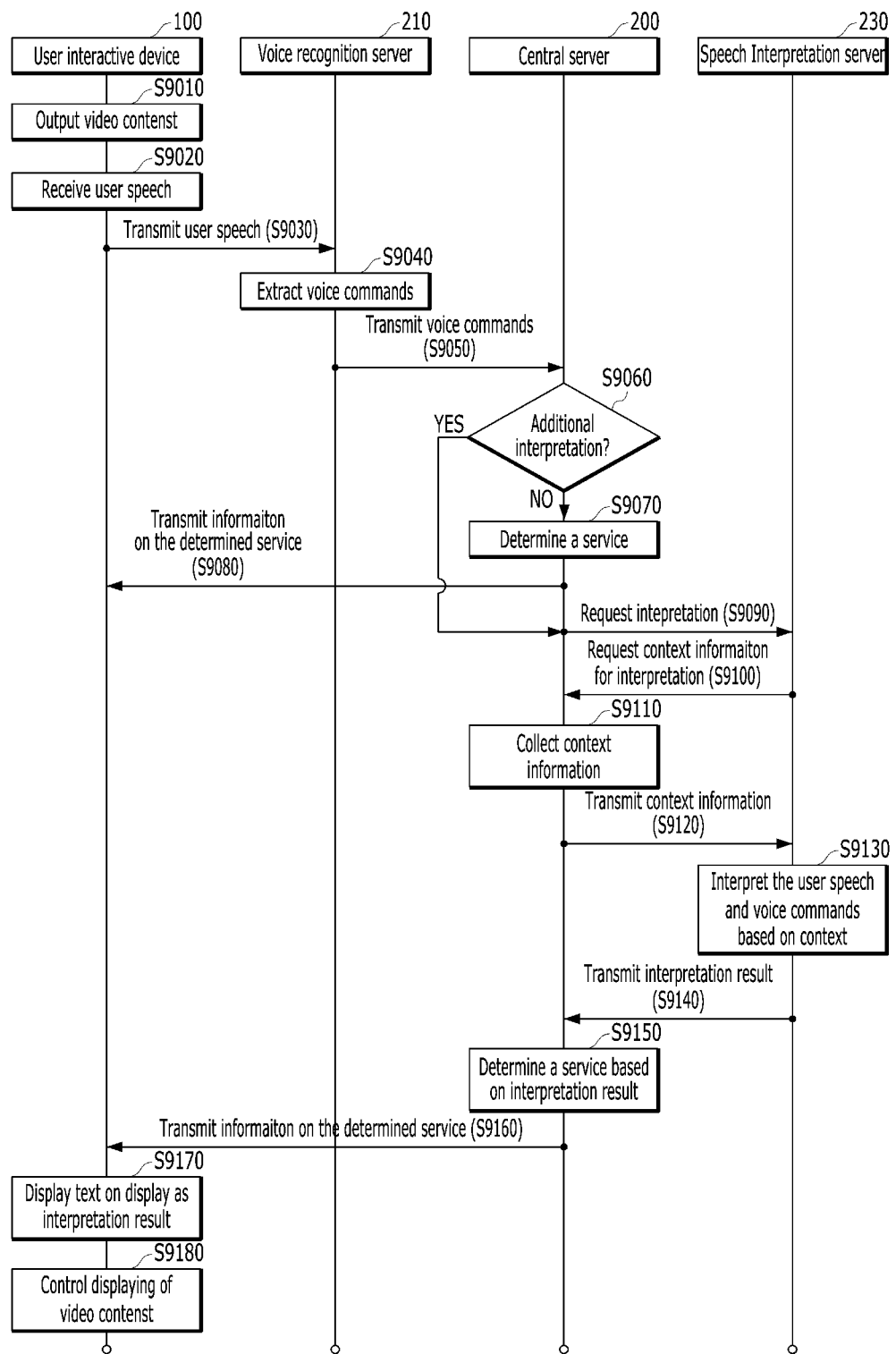
FIG. 9 illustrates a method of providing a service based on a voice command in accordance with at least one embodiment.

Hereinafter, various embodiments of providing a service based on a voice command will be described with the accompanying drawings. FIG. 9 illustrates a method of providing a service based on a voice command in accordance with at least one embodiment. In particular, FIG. 9 illustrates voice recognition server 210 used for extracting voice commands from user speech and speech interpretation server 230 for additional interpreting and analyzing voice commands and user speech based on context information.

Referring to FIG. 9, user interactive device 100 outputs video contents through display device 504 coupled to user interactive device 100 in response to user speech inputted to user interactive device 100 at step S9010. While displaying the video contents, user interactive device 100 receives user speech from a user at step S9020 and transmits the user speech to voice recognition server 210 at step S9030. Voice recognition server 210 extracts at least one of voice commands from the user speech at step S9040 and transmit the extracted at least one of voice commands to central server 200 at step S9050.

Central server 200 determines whether additional interpretation (e.g., second interpretation) of voice commands or user speech is required at step S9060. When the additional interpretation is not required (No—S9060), central server 200 determines a service corresponding to the voice commands at step S9070 and transmits information on the determined service to user interactive device 100 at step S9080. In accordance with at least one embodiment, the information on the determined service may include at least one control signal and audio and video feedbacks associated with the determined service. When the additional interpretation is required (Yes—S9060), central server 200 transmits the user speech or the voice commands to speech interpretation server 230 and requests speech interpretation server 230 to interpret the user speech or the voice command at step S9090.

Speech interpretation server 230 requests context information of user interactive device 100 to central server 200, which is required to interpret the user speech or the voice command at step S9100. Central server 200 collects the context information of user interactive device 100 at step S9110 and transmits the collected context information to speech interpretation server 230 at step S9120. In this case, the context information of user interactive device 100 may be collected by central server 200 at a regular interval.

Speech interpretation server 230 performs interpretation of the voice commands and the user speech based on the context information of user interactive device 100 at step S9130. Speech interpretation server 230 transmits the interpretation result to central server 200 at step S9140. Central server 200 determines a service corresponding to the interpretation result at step S9150. Central server 200 may transmit information on the determined service to user interactive device 100 at step S9160. At step S9170, user interactive device 100 displays the information including at least one of the voice commands and the answer to the voice command, which are the voice recognition result and the interpretation result, as text messages on display device 504.

If display device 504 is displaying other video contents, the information may be displayed on display device 504 in overlapping manner. At step S9180, user interactive device 100 controls video contents being reproduced and displayed on display device 504 according to the service received from central server 200.

Figure 10:
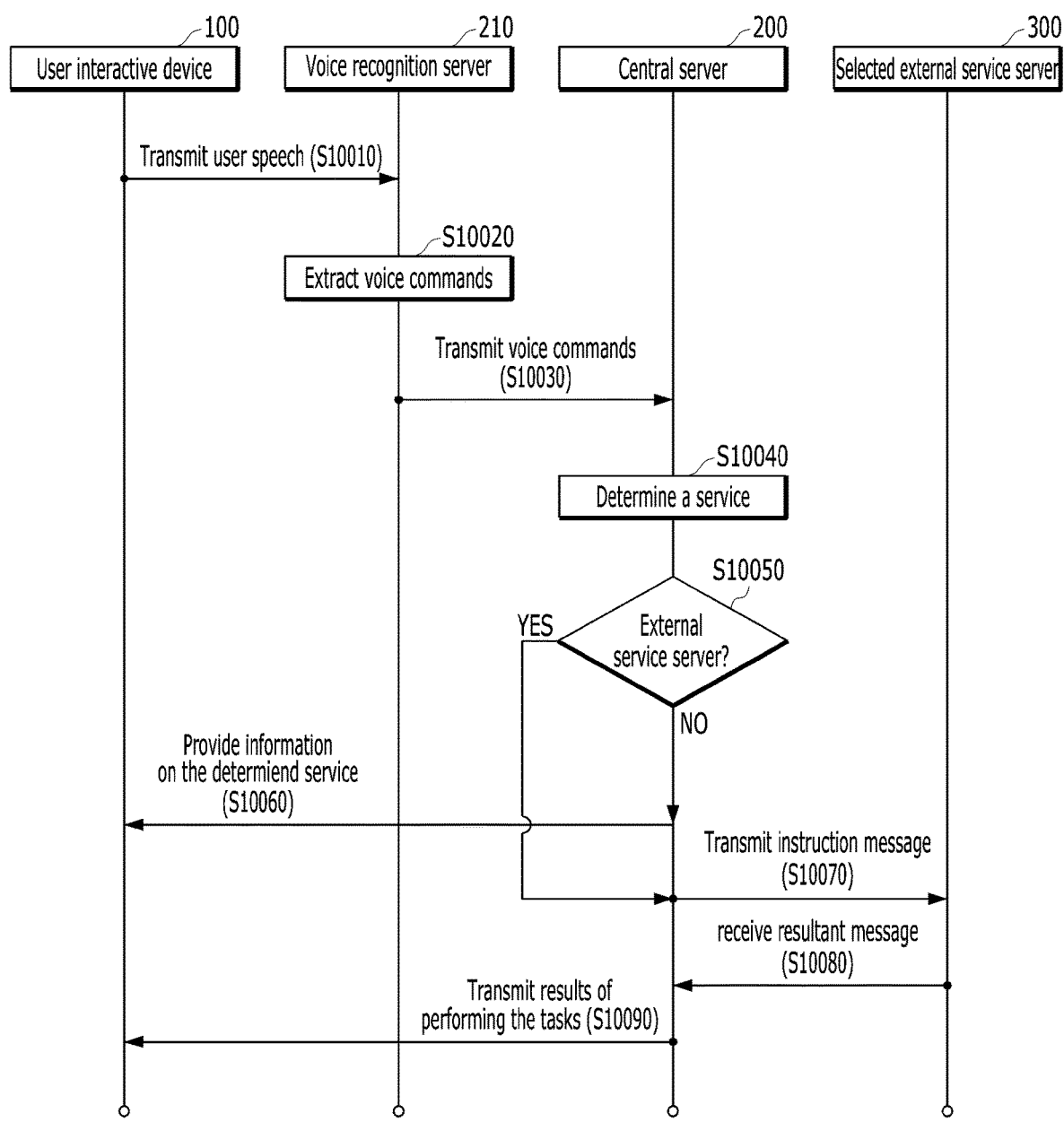
FIG. 10 illustrates a method of providing a service based on a voice command in accordance with another embodiment of the present disclosure.

FIG. 10 illustrates a method of providing a service based on a voice command in accordance with another embodiment of the present disclosure. In particular, FIG. 10 illustrates voice recognition server 210 for extracting voice commands from user speech and external service server 300 to perform external tasks based on the external voice commands. Referring to FIG. 10, user interactive device 100 transmits user speech (e.g., voice signal) received from a user to voice recognition server 210 at step S10010. Voice recognition server 210 extracts at least one vice command from the user speech at step S10020 and transmit the extracted voice commands (the extraction result) to central server 200 at step S10030. Central server 200 analyzes the received voice commands and determines a service based on the analysis result at step S10040.

At step S10050, central server 200 determines whether the determined service requires cooperation of service servers 300 (e.g., whether the determined service is an internal service or an external service). When the cooperation of service server 300 is not required (No—S10050), central server 200 transmits information on the determined service to user interactive device 100 at step S10060. That is, central server 200 may perform internal tasks with user interactive device 100, generate control signals and audio and video feedback based on the result of internal tasks, and transmit the generated control signals and audio and video feedback to user interactive device 100.

When the cooperation of service server 300 is required (Yes—S10050), central server 200 requests a predetermined service server 300 to perform the determined service at step S10070. For example, central server 200 may select at least one external service server, generate an instruction message based on the determined service, the selected service server, and registration information of the selected server, and transmit the generated instruction message to the selected external server. The selected external server may perform at least one of tasks based on the instruction message, generate a resultant message including information on a result of performing the tasks, and transmit the generated resultant message to central server 200. Central server 200 receives a performance result from service server 300 at step S10080 and generates and transmits at least one of control signals and audio and video feedback to user interactive device 100 at step S10090.

Figure 11:
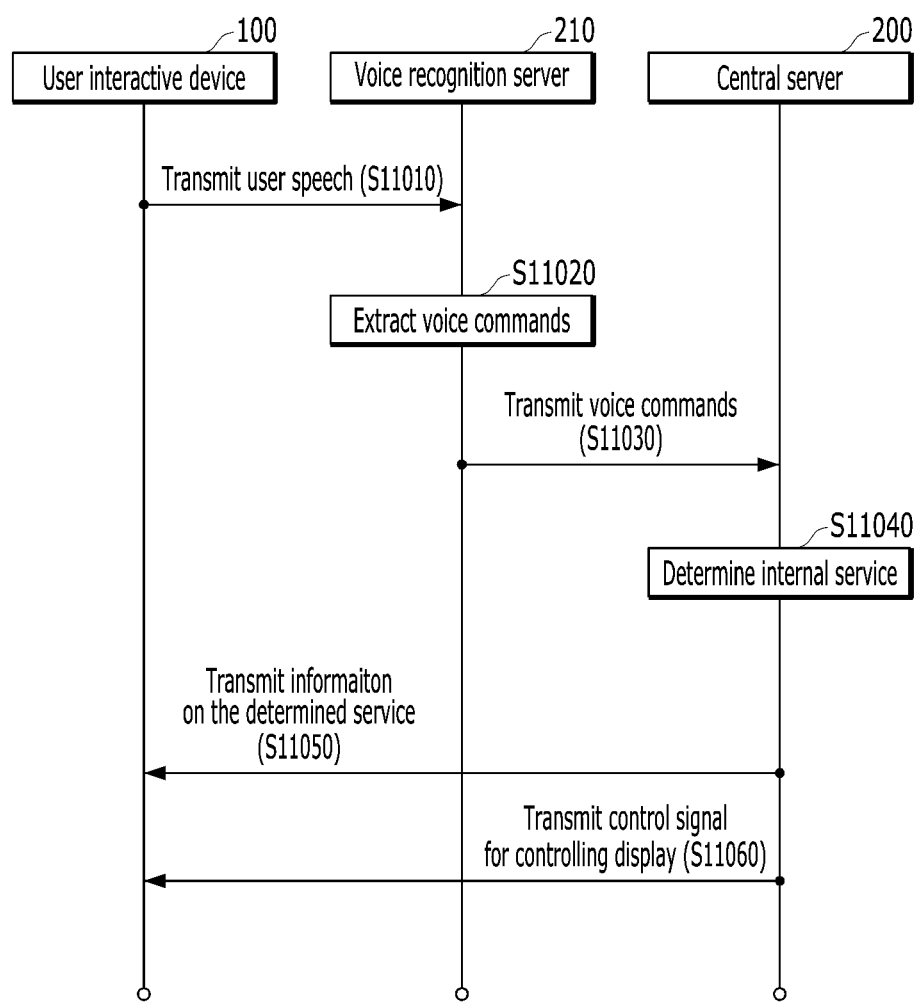
FIG. 11 illustrates a method of providing a service based on a voice command in accordance with still another embodiment of the present disclosure.

FIG. 11 illustrates a method of performing a service based on voice command in accordance with still another embodiment of the present disclosure. In particular, FIG. 11 shows a method for providing an internal service. Referring to FIG. 11, user interactive device 100 receives user speech from a user and transmits the received user speech to voice recognition server 210 at step S11010. Voice recognition server 210 extracts at least one voice command from the user speech at step S11020 and transmit the extracted voice commands to central server 200 at step S11030. At step S11040, central server 200 analyzes the voice commands received from voice recognition server 210 and determine an internal service as a service to be provided and tasks to be performed based on based on the analysis result. At step S11050, central server 200 transmits information on the selected service to user interactive device 100. At step S11060, central server 200 generates at least one of control signals and audio and video feedback based on the result of performing tasks and transmits the generated control signals and audio and video feedback to user interactive device 100 to control display device 504 to output the audio and video feedback.

Figure 12:
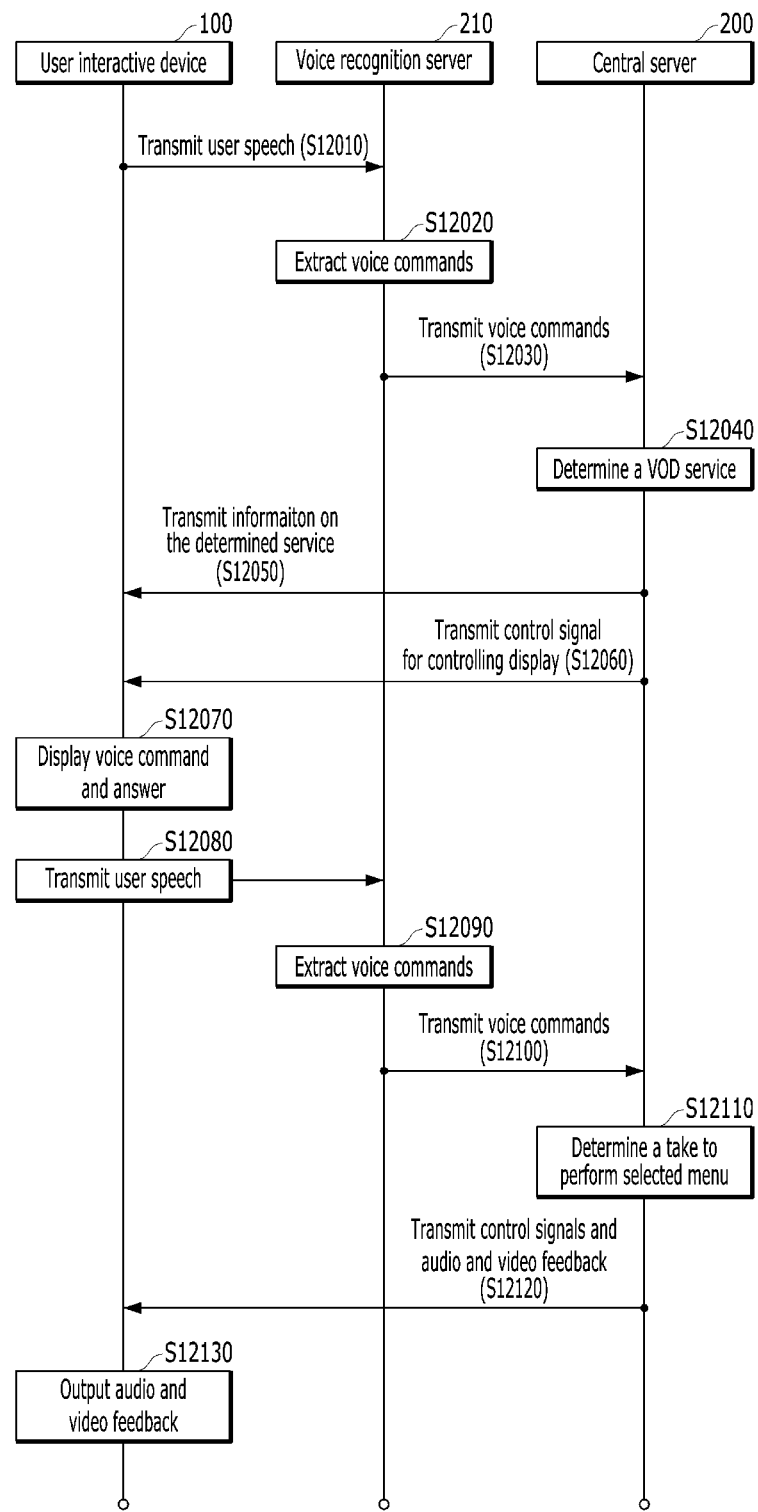
FIG. 12 illustrates a method of providing a service based on a voice command in accordance with yet another embodiment of the present disclosure.

FIG. 12 illustrates a method of providing a service based on a voice command in accordance with yet another embodiment of the present disclosure. In particular, FIG. 12 illustrates a method of providing a VOD service, as an internal service, based on voice commands. Referring to FIG. 12, user interactive device 100 receives user speech " . . . I want to watch a movie . . . " from a user and transmits the received user speech to voice recognition server 210 at step S12010. Voice recognition server 210 extracts at least one voice command (e.g., watch and/or movie) from the user speech at step S12020 and transmits the extracted voice commands to central server 200 at step S12030.

At step S12040, central server 200 analyzes the voice command and determines a VOD service based on the analysis results as an internal service to be provided. At step S12050, central server 200 transmits information on the selected VOD service to user interactive device 100. At step S12060, central server 200 transmits at least one of control signals and audio and video feedback according to the selected service. At step S12070, user interactive device 100 outputs the audio and video feedbacks in response the received control signals. For example, the transmitted information on the selected VOD service may be a user interface of an associated VOD application (e.g. APP) in order to enable a user to select and control all features of the associated VOD application. Such information may be outputted through at least one of display 504 and speaker. For example, based on the information, user interactive device 100 may display a list of action movies on display 504 and output " . . . how about action movies . . . " through speakers.

At step S12080, user interactive device 100 may receive user speech to perform tasks each associated with menus and options in the associated VOD application and transmit the received user speech to voice recognition server 210. Voice recognition server 210 extracts at least one voice command from the user speech at step S12090 and transmits the extracted voice commands to central server 200 at step S12100.

At step S12110, central server 200 analyzes the voice command, selected at least one of menus and options of the VOD application, determines a task to perform based on the selection result, performs the determined task, and generates at least one of control signals and audio and video feedback based on the performance result. At step S12120, central server 200 transmits the generated control signals and audio and video feedback to user interactive device 100. At step S12130, user interactive device 100 may output the received audio and video feedback through display and speakers according to the control signals. Such operations of S12110 and S12130 may be repeatedly performed whenever user interactive device 100 receives user speech related to the internal service. As described, in case of the internal service, a user may be enabled to perform menus and options of an associated application through central server 200 and user interactive device 100 in accordance with at least one embodiment.

Figure 13:
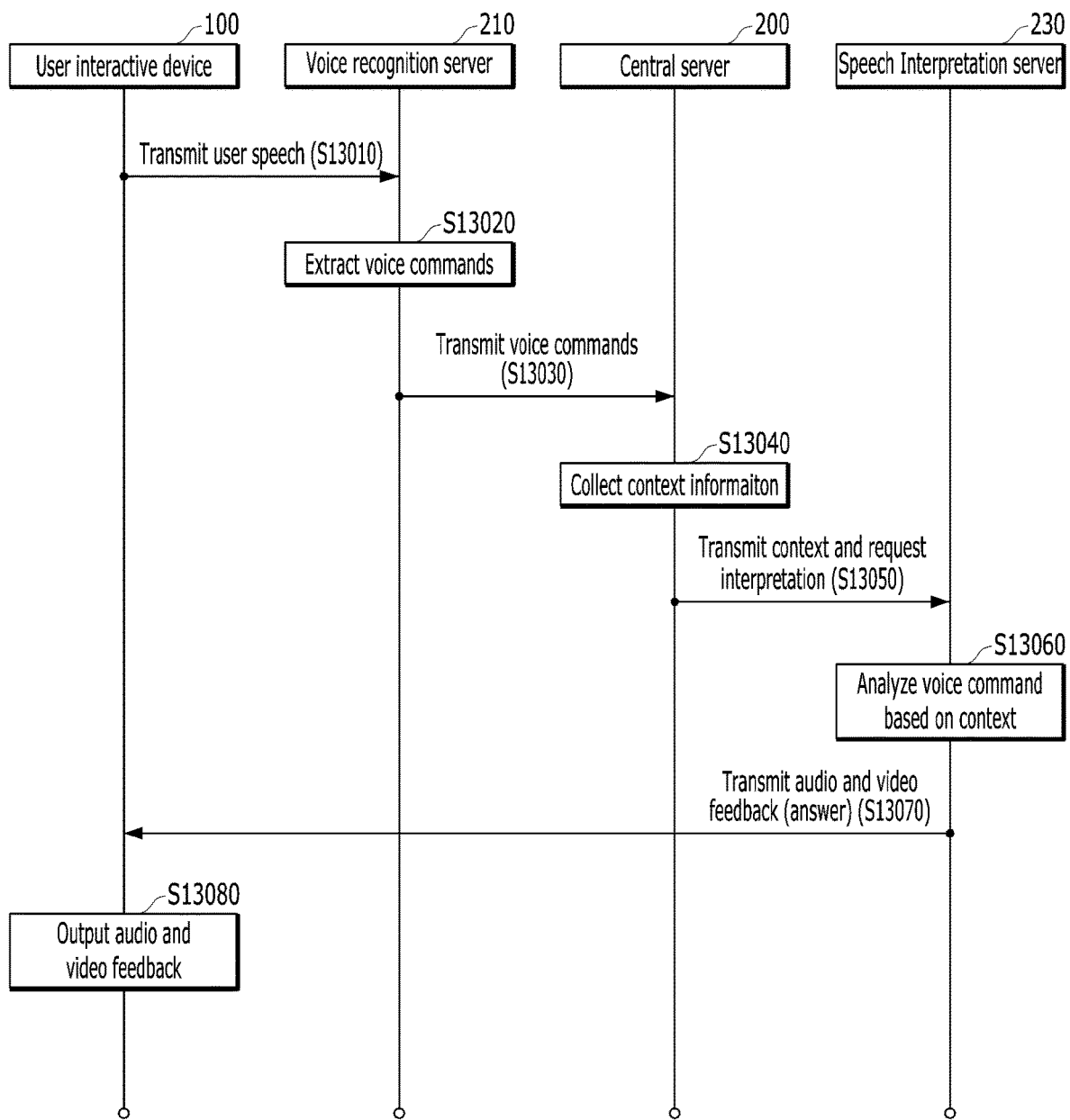
FIG. 13 illustrates a method for providing a service in response to a voice command in accordance with further another embodiment of the present disclosure.

FIG. 13 illustrates a method for providing a service in response to a voice command in accordance with further another embodiment of the present disclosure.

Referring to FIG. 13, user interactive device 100 detects user speech from a user and transfers the detected user speech to voice recognition server 210 at step S13010. Voice recognition server 210 extract at least one of voice commands from the user speech at step S13020 and transfers the extracted at least one of voice commands to central server 200 at step S13030. Central server 200 may collect context of user interactive device 100, which might be required to analyze or detect an intention of a voice command at step S13040. In this case, central server 200 may regularly collect the context in at a predetermined interval.

Central server 200 may transmit the collected context and the voice commands to speech interpretation server 230 and request speech interpretation server 230 to interpret the voice commands (e.g., user speech) based on the collected context at step S13050. Speech interpretation server 230 may interpret the voice commands based on the context information of user interactive device 100 at step S13060. Speech interpretation server 230 may transmit the interpretation result to user interactive device 100, wherein the interpretation result includes at least one of a control signal, audio and video feedback, and so forth, at step S13070. User interactive device 100 may perform a task in response to the control signal and output the audio and video feedback through a speaker and a display at step S13080.

Figure 14:
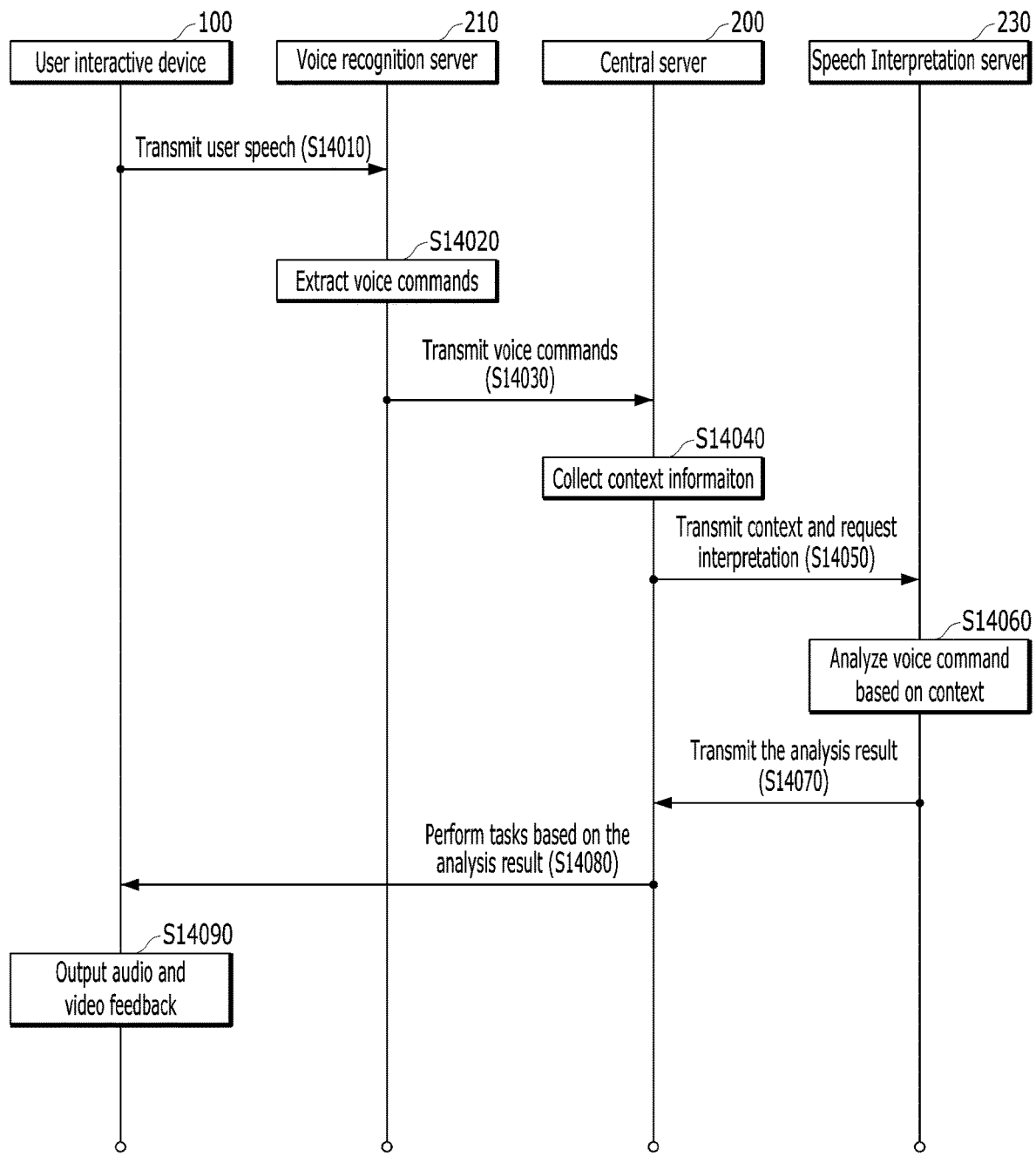
FIG. 14 illustrates a method for providing a service in response to user speech in accordance with further still another embodiment of the present disclosure.

FIG. 14 illustrates a method for providing a service in response to user speech in accordance with further still another embodiment of the present disclosure. Referring to FIG. 14, user interactive device 100 may receive user speech (e.g., voice commands) from a user and transfer the received user speech to voice recognition server 210 at step S14010. Voice recognition server 210 may extract voice commands from the received user speech at step S14020 and transmit the extracted voice commands to central server 200 at step S14030.

Central server 200 may collect context of user interactive device 100 for interpreting the voice commands at step S14040. Central server 200 may transmit the voice commands and the context to speech interpretation server 230 and request speech interpretation server 230 to interpret the voice commands based on the context of user interactive device 100 at step S14050. Speech interpretation server 230 may interpret the voice commands based on the context at step S14060. Speech interpretation server 230 may transmit the interpretation result to central server 200 at step S14070. Central server 200 may determine a service based on the interpretation result in cooperation with at least one of external service servers 300 and transfer information on the determined service to user interactive device 100 at step S14080. User interactive device 100 may output the information on the determined service through at least one of speakers and displays at step S14090.

Figure 15:
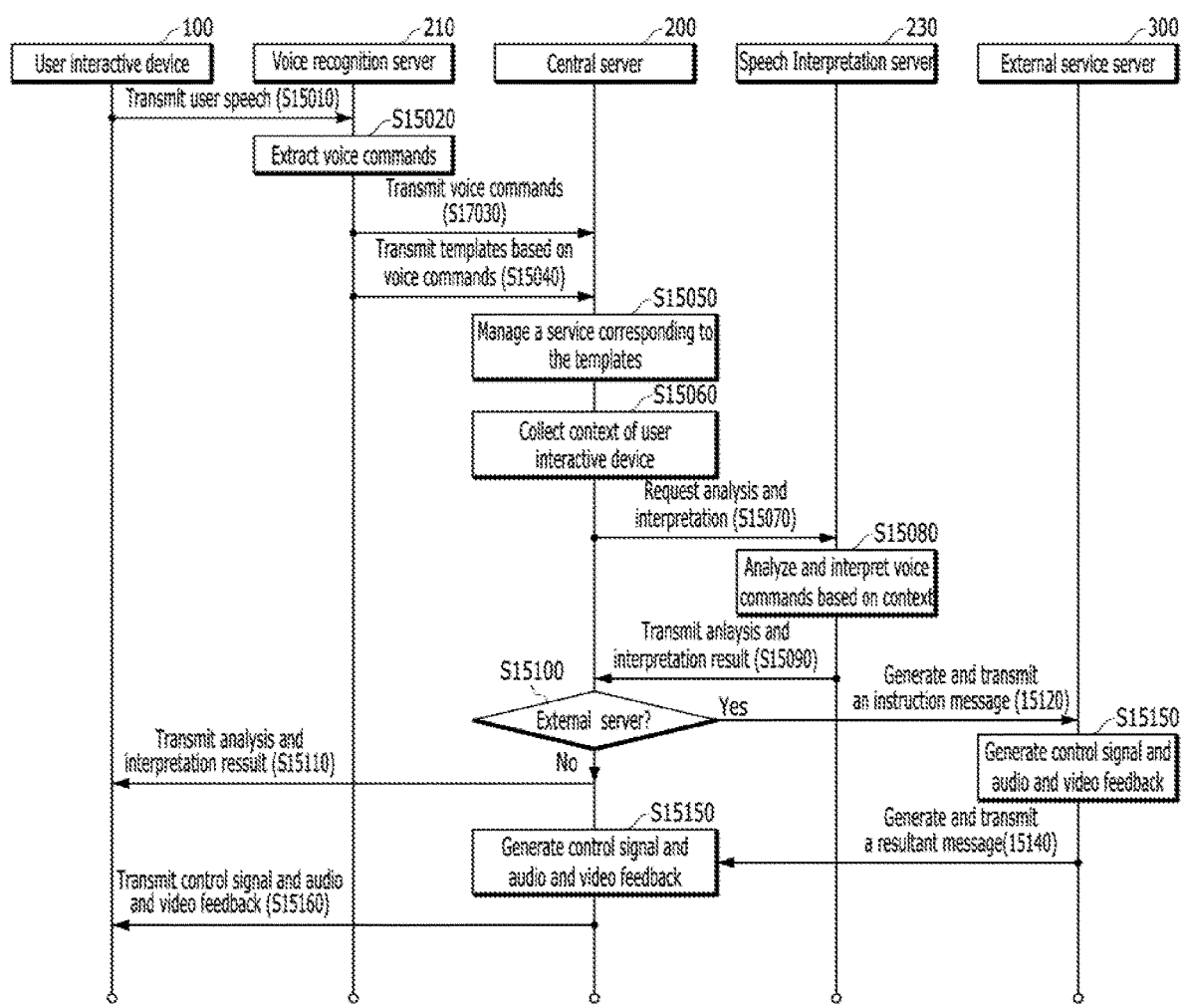
FIG. 15 illustrates a method for providing a service in response to voice commands in accordance with further still another embodiment of the present disclosure.

FIG. 15 illustrates a method for providing an external service in response to voice commands in accordance with still another embodiment of the present disclosure. Referring to FIG. 15, user interactive device 100 may receive user speech and transmit the user speech to voice recognition server 230 at step S15010. Voice recognition server 230 extracts voice commands from the user speech at step S15020 and transmit the extracted voice commands to central server 200 at step S15030. Central server 200 may receive inquiry templates associated with the voice commands from voice recognition server 230 at step S15040. Central server 200 may manage services corresponding to inquiry templates at step S15050. Central server 200 may collect context of user interactive device 100 for interpreting intention of user speech (e.g., voice commands) at step S15060.

Central server 200 may transmit the voice commands and the collected context to speech interpretation server 230 and request speech interpretation server 230 to interpret the voice commands based on the collected context at step S15070. Speech interpretation server 230 may interpret and analyze the voice commands based on the context at step S15080. Central server 200 may receive the answer to the user speech (e.g., the interpretation results and the analysis result) from speech interpretation server 210 at step S15090.

Central server 200 may determine whether a corresponding service is associated with at least one of external service servers 300 at step S15100. When the corresponding service is not associated with at least one of external service servers 300 (No—S15100), central server 200 may transmit the interpretation results and the analysis result to user interactive device 100 at step S15110. When the corresponding service is associated with at least one of external service servers 300 (Yes—S15100), central server 200 may determine an external service sever corresponding to the user speech based on the interpretation results and the analysis results, and generate and transmit an instruction message to the determined external service server at step S15120. External service server 300 may determine at least one of tasks to perform based on information in the instruction message, perform at least one of tasks, and generate and transmit a resultant message to central server 200 at step S15140. Central server 200 may generate at least one of control signals and audio and video results based on the resultant message including information on the result of performing the tasks at step S15150. At step S15160, central server 200 may transmit the generated control signals and audio and video result to user interface device 100.

Central server 200 may transmit the generated at least one of control signals and audio and video results to user interactive device 100 at step S15130.

Figure 16:
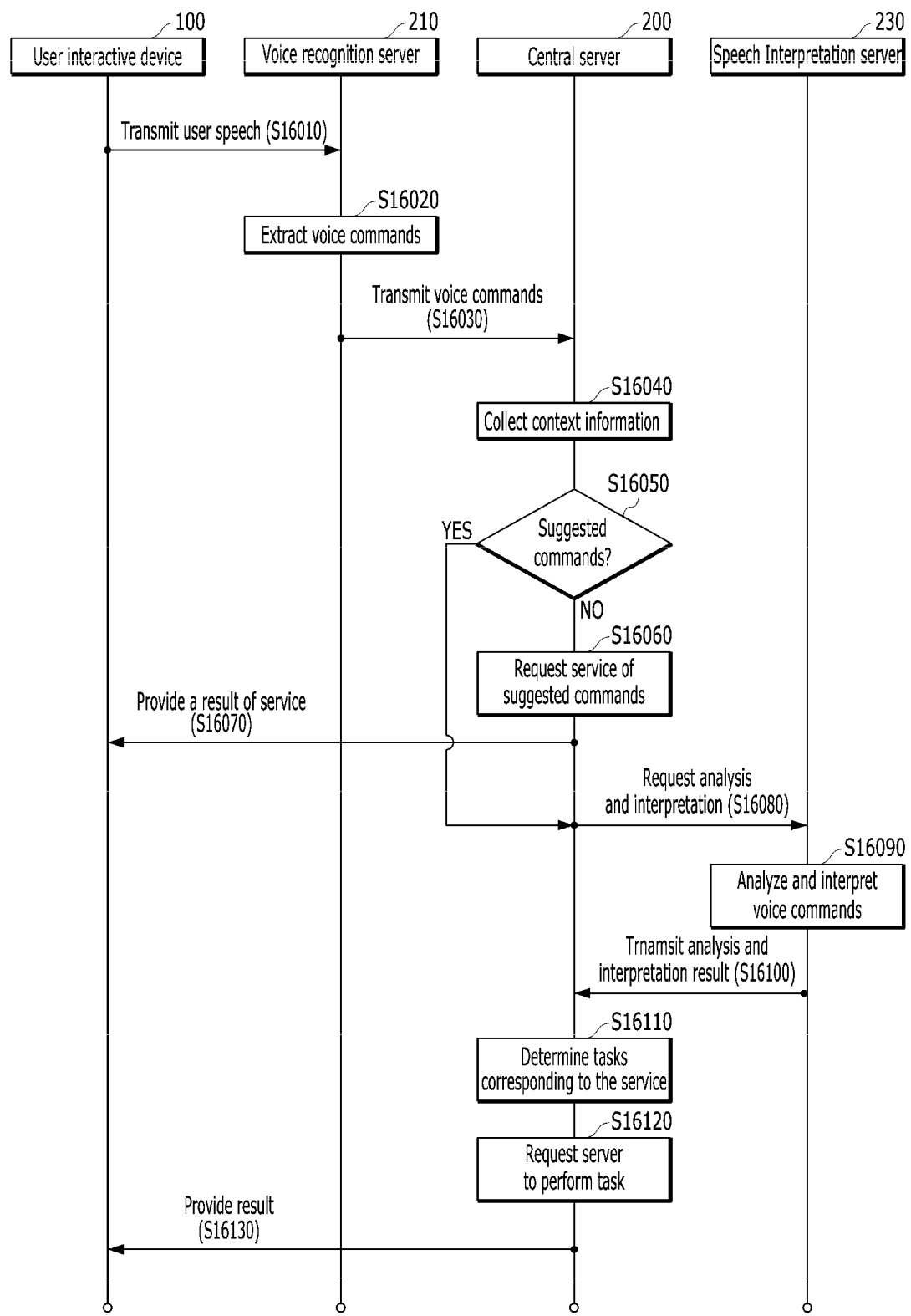
FIG. 16 is a timing diagram illustrating a method for providing a service in response to use speech in accordance with further yet another embodiment of the present disclosure.

FIG. 16 is a timing diagram illustrating a method for providing a service in response to use speech in accordance with further yet another embodiment of the present disclosure. Referring to FIG. 16, user interactive device 100 may receive user speech and transmit the received user speech to voice recognition server 210 at step S16010. Voice recognition server 210 may extract voice commands from the user speech at step S16020 and transmit the extracted voice commands to central server 200 at step S16030. Central server 200 may collect context of user interactive device 100 for interpreting and analyzing the voice commands and intention of the user speech at step S16040.

Central server 200 may determine whether the voice commands are suggested commands formed of predetermined event values at step S16050. The suggested commands formed of predetermined event values are commands corresponding to a service previously provided to a corresponding user. When the voice commands are the suggested commands (Yes—S16050), central server 200 may request the related internal server to suggest a service at step S16060. Central server 200 may perform at least one tasks related to the suggested service, generate at least one of control signals and audio and video feedbacks based on the result of performing the at least one task, and provide the generated control signals and audio and video feedbacks to user interactive device 100 at step S16070.

When the voice commands are not the suggested commands (No—S16050), central server 200 may transmit the voice commands and the collected context to Speech interpretation server 230 and request speech interpretation server 230 to interpret and analyze the voice commands based on the collected context at step S16080. Speech interpretation server 230 may interpret and analyze the voice commands based on the context of user interactive device 100 at step S16090. Central server 200 may receive answer to the user speech (e.g., the interpretation results and the analysis result) from speech interpretation server 230 at step S16100.

Central server 200 may determine suggested situations according to the received answer (e.g., the interpretation results and the analysis results) and determine at least one task to perform in cooperation with at least one external service server 300 at step S16110. Central server 200 may request internal servers to suggest a service based on the determined at least one task at step S16120. Central server 200 may transmit information on the suggested service to user interactive device 100 at step S16130.

Figure 17:
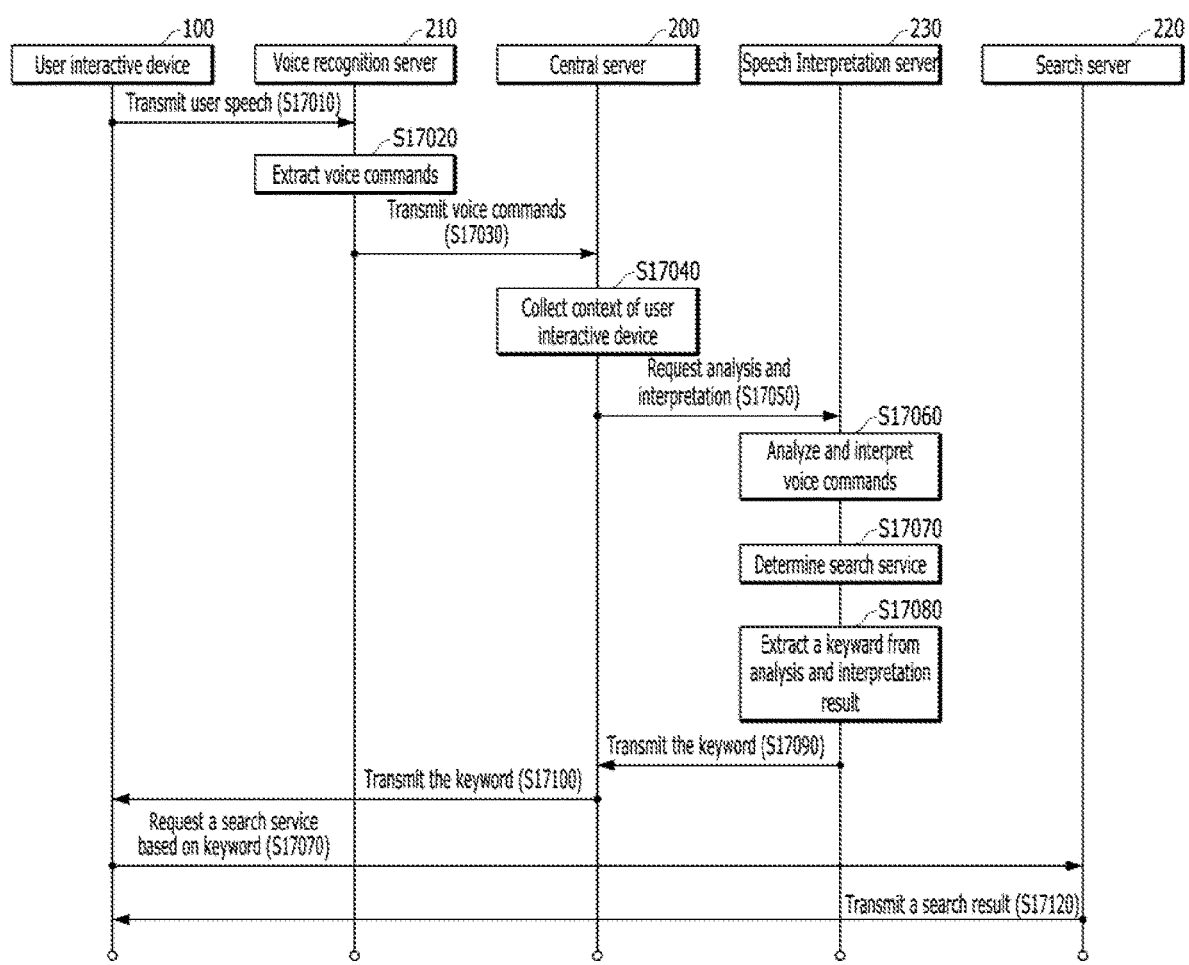
FIG. 17 is a timing diagram illustrating a method for providing a service based on user speech in accordance with at least one embodiment of the present invention.

FIG. 17 is a timing diagram illustrating a method for providing a service based on user speech in accordance with at least one embodiment of the present invention. Referring to FIG. 17, user interactive device 100 may receive user speech and transmit the user speech to voice recognition server 210 at step S17010. Voice recognition server 210 may extract voice commands from user speech at step S17020 and transmit the extracted voice commands to central server 200 at step S17030. Central server 200 may collect context of user interactive device 100 for interpreting the voice commands and determine intentions of the user speech at step S17040. Central server 200 may transmit the voice commands and the context to speech interpretation server 230 and request speech interpretation server 230 to interpret and analyze the voice commands based on the context information at step S17050.

Speech interpretation server 230 may interpret and analyze the voice commands based on the context information at step S17060 and determine whether the voice commands for searching predetermined information at step S17070. When the voice commands are for searching information (Yes—S17070), speech interpretation server 230 may extract a search keyword from the user speech or the voice commands at step S17080. The search keyword may include a title of contents, a name of actor or actress, or a name of a singer. Speech interpretation server 230 may transmit the extracted search keyword to central server 200 at step S17090, and central server 200 may transmit the search keyword to user interactive device 100 at step S17100.

User interactive device 100 may transmit the search keyword to search server 240 and request search server 240 to perform a search operation based on the search keyword at step S17110. User interactive device 100 may receive search results from search server 240 at step S17120.

As described, a service may be classified into an internal service and an external service whether the service requires at least one of external service server 300 in accordance with at least one embodiment. However, the embodiments of the present disclosure are not limited thereto. For example, a service may be classified into a first service and a second service whether central server is interconnected with a predetermined target server in accordance with another embodiment. Herein, the target server may be one of external service servers 300, but the embodiments are not limited thereto. Hereinafter, a method for providing a service when the service is determined one of the first service and the second service.

In accordance with at least one embodiment, user interactive device 100 may determine whether a service associated with user speech is a first service or a second service and may receive an answer (e.g., audio and video feedback) from central server 200 based on the determination result. For example, when the service is determined as the first service, user interactive device 100 may receive, from central server 200, a request message for performing operations for the first server based on the user speech. When the service is determined as the second service, user interactive device 100 may receive, from central server 200, a call command for calling a predetermined application for providing the second service associated with the user speech.

User interactive device 100 may perform operations (e.g., tasks) according to information received as an answer to the user speech (e.g., control signals and audio and video feedback). For example, user interactive device 100 may receive information provided from a target server, wherein the information may be as a result of performing operations by the target server in order to provide the associated service in response to the user speech. Alternatively, user interactive device 100 may call a predetermined application previously installed therein based on the call command and receive information on the service from the target service through the application.

When the service is determined as the first service, user interactive device 100 may receive information on the service (e.g., result of performing operations for providing the first service by the target server) from the target server and display the received information as the service on display 504. For example, when the service is a VOD service, user interactive device 100 may receive predetermined video contents as the information on the service, reproduce and display the received video contents on display 504. Unlike the first service, when the service is determined as the second service, user interactive device 100 may display an initial user interface of a corresponding application (e.g., app) provided from the target server. That is, the service may be classified into a first service and a second service whether central server 200 is able to be interconnected with a target server or not.

In order to classify the service into the first service and the second service whether central server 200 is interconnected with a target server and provide a service based on such classification, central server 200 may perform operations as follows in accordance with at least one embodiment. Central server 200 may receive information on user speech. In particular, central server 200 may receive a template corresponding to voice commands in the user speech from voice recognition server 210. The template may include various types of information corresponding to voice commands, for example, including mapping information to higher layer commands. Such templates may be classified by a service corresponding to an inquiry type.

Central server 200 may determine whether a service corresponding to the received user speech is a first service or a second service. In particular, central server 200 may determine whether central server 200 is able to access a target server. When the central server 200 is able to access the target server, central server 200 determines that the service corresponding to the user speech is the first service. When the central server 200 is not able to access the target server, central server 200 determines that the service corresponding to the user speech is the second service.

Central server 200 may generate answers in response to the received user speech based on the determination result. For example, when the service corresponding to the user speech is determined as the first service, central server 200 may generate a request message for performing operations associated with the service based on the user speech in cooperation with the target server. When the service corresponding to the user speech is determined as the second service, central server 200 may generate a call command for calling a predetermined application for providing the service based on the user speech.

Central server 200 may transmit the generated answer (e.g., call command or request message) to user interactive device 100. For example, when the service corresponding to the user speech is determined as the first service, central server 200 may transmit the request message to user interactive device 100. The request message may include information for enabling user interactive device 100 to receive information on the service (e.g., a result of performing operations for the service) from the target server. When the service corresponding to the user speech is determined as the second service, central server 200 may transmit the call command to user interactive device 100. The call command may include information for enabling user interactive device 100 to receive information on the service (e.g., a result of performing operations for the service) from the target server by calling a predetermined application (e.g., app) which is installed in user interactive device 100.

Figure 18:
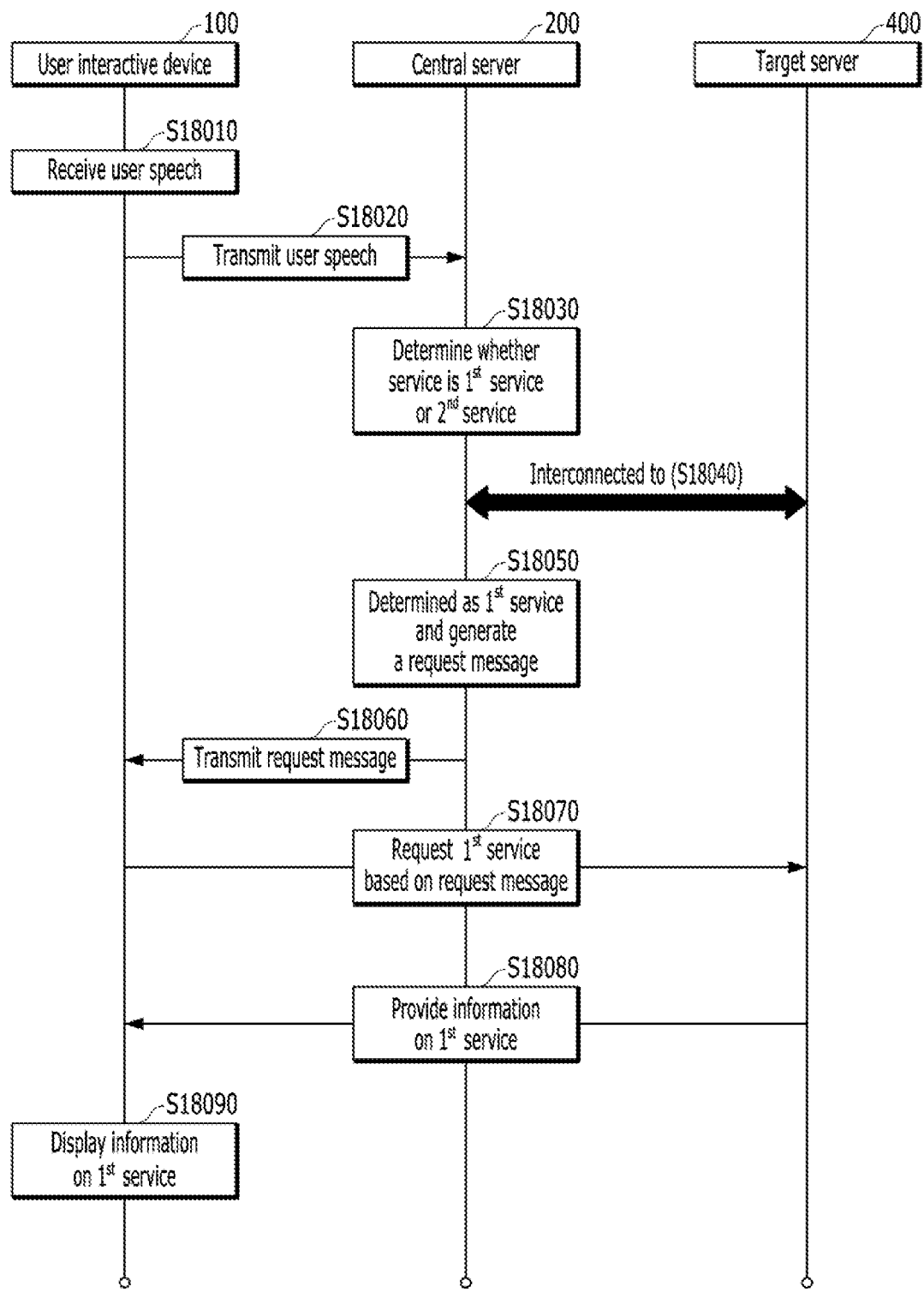
FIG. 18 is a flowchart for illustrating a method for providing a service when the service is determined as a first service in accordance with at least one embodiment.

FIG. 18 illustrates a method of providing an artificial intelligence user interactive service based on user speech when the service is determined as a first service in accordance with further still another embodiment.

Referring to FIG. 18, user interactive device 100 may receive user speech at step S18010 and transmit the received user speech to central server 200 at step 18020. Central server 200 may determine whether a service to be provided is a first service or a second service at step S18030. At step S18040, central server 200 may determine that the service to be provided is the first server when central server 200 is interconnected with a target server providing the service associated with the user speech. Herein, the target server may be one of external service servers 300, but the present embodiment is not limited thereto. At step S18050, central server 200 may generate a request message for performing a service based on the received user speech.

Central server 200 may transmit the request message to user interactive device 100 at step S18060. User interactive device 100 may request the target service to perform operations for providing the service based on the request message at step S18070, and the target server may perform operations and provide information on a result of performing the service to user interactive device 100 at step S18080.

Figure 19:
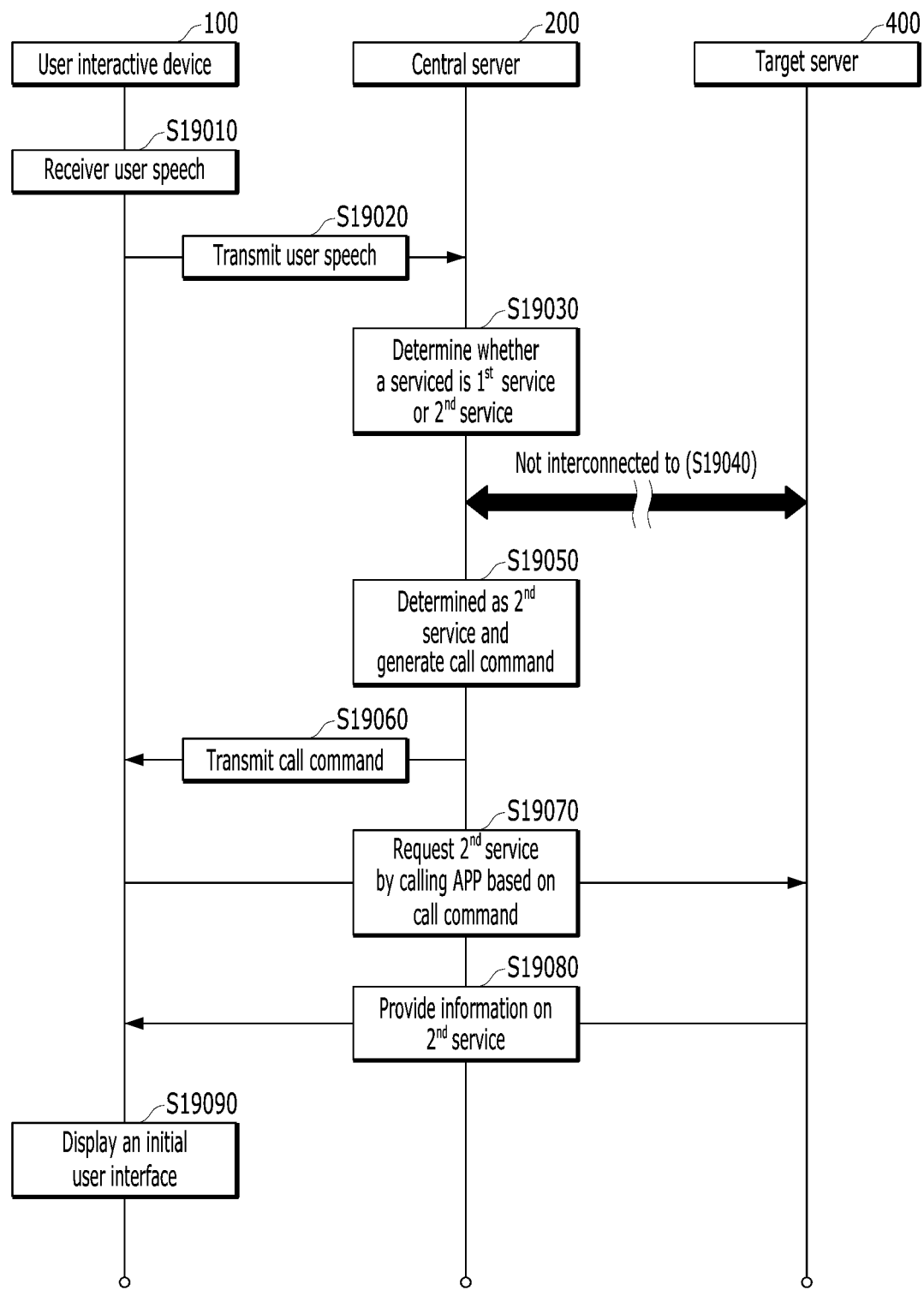
FIG. 19 is a flowchart for illustrating a method for providing a service when the service is determined as a second service in accordance with at least one embodiment; and FIG. 20 to FIG. 23 illustrates examples of providing a service based on a voice command in accordance with at least one embodiment.

FIG. 19 illustrates a method of providing an artificial intelligence user interactive service based on user speech when the service is determined as a second service in accordance with further still another embodiment.

Referring to FIG. 19, user interactive device 100 may receive user speech at step S19010 and transmit the received user speech to central server 200 at step 19020. Central server 200 may determine whether a service to be provided is a first service or a second service at step S19030. At step S19040, central server 200 may determine that the service to be provided is the second server when central server 200 is not interconnected with a target server providing the service associated with the user speech. At step S19050, central server 200 may generate a call command for calling an application for providing a service based on the received user speech.

Central server 200 may transmit the call command to user interactive device 100 at step S19060. User interactive device 100 may request the target service to perform operations for providing the service by invoking the predetermined application based on the call command and at step S19070, and the target server may perform operations and provide information on a result of performing the service to user interactive device 100 at step S19080. User interactive device 100 may display an initial screen of the predetermined application for providing the service at step S19090.

FIG. 20 to FIG. 24 illustrates examples of providing a service based on a voice command in accordance with at least one embodiment.

Figure 20:
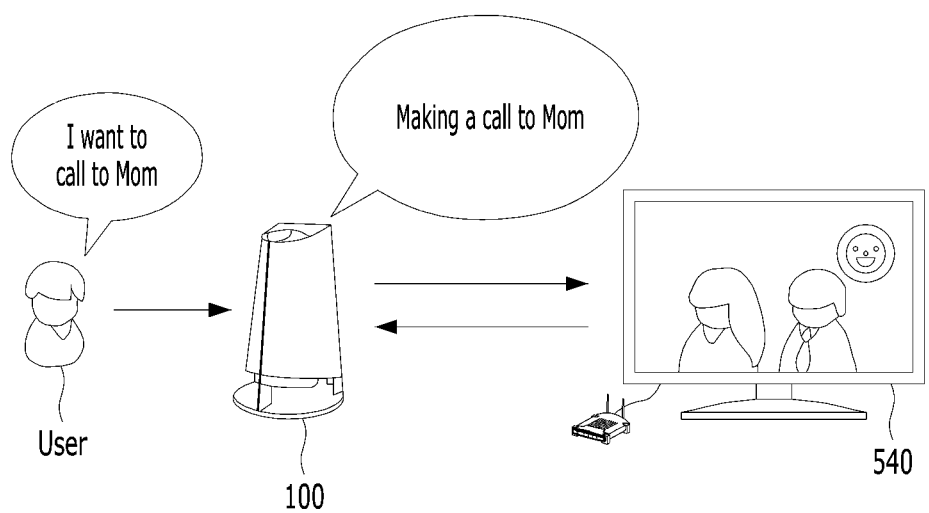

Referring to FIG. 20, user interactive device 100 may receive first user speech of "I want to make a call to Mom". In this case, user interactive device 100 transmits the first user speech to voice recognition server 210. Voice recognition server 210 receives the first user speech, extracts a first voice command "Mom" and a second voice command "call," and transmit the first and second voice commands "Mom" and "call" to central server 200.

Central server 200 receives the first voice command "Mom" and the second voice command "call" from voice recognition server 210. User interactive device 100 may output "making a call to Mom" as audio and video feedback (answer) through speakers of user interactive device 100.

Central server 200 selects a service (e.g., call service) based on the first and second voice commands "Mom" and "call" using at least one internal service module and performs the selected call service through user interactive device 100. Here, the at least one internal service module may include an address book service module as a first internal service module and a video call service module as a second internal service module. Central server 200 may perform at least one task related to the call service in cooperation with display 504 coupled to user interactive device 100. For example, central server 200 may search a telephone number of Mom through the first internal service module and perform a video call service through the second internal service module in cooperation with display 504 coupled to user interactive device 100.

Figure 21:
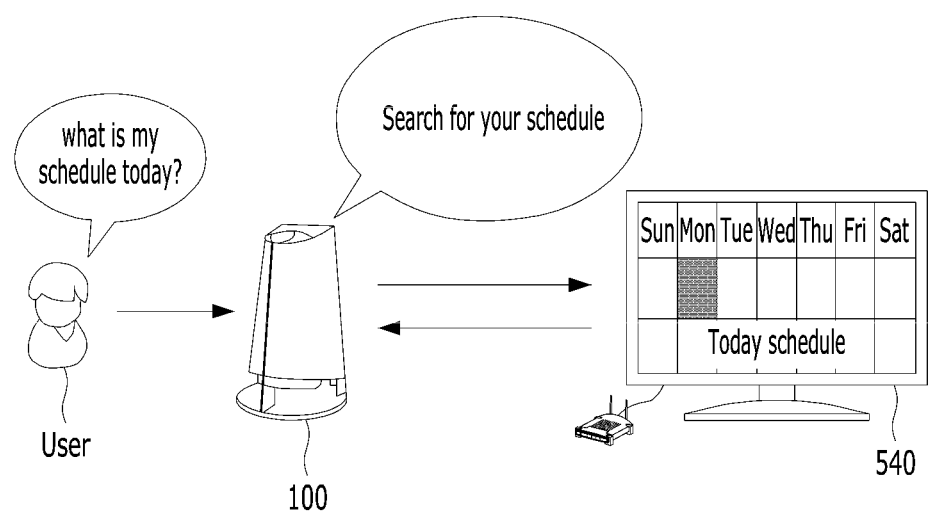

Referring to FIG. 21, user interactive device 100 receives second user speech " . . . what is my schedule today?" In this case, central server 200 may extract voice commands of "schedule" and "today", generate audio and video feedback of " . . . searching for today schedule", and output the generated audio and video feedback through speakers and displays associated with user interactive device 100.

Furthermore, central server 200 determines a service based on the voice commands through a third internal service module (e.g., calendar module), performs at least one takes, for example, searching schedules in a user's calendar, and outputs the result of performing the task through speaker and displays associated with user interactive device 100. For example, the searched schedule may be displayed in text on display 504 in overlapping manner.

Figure 22:
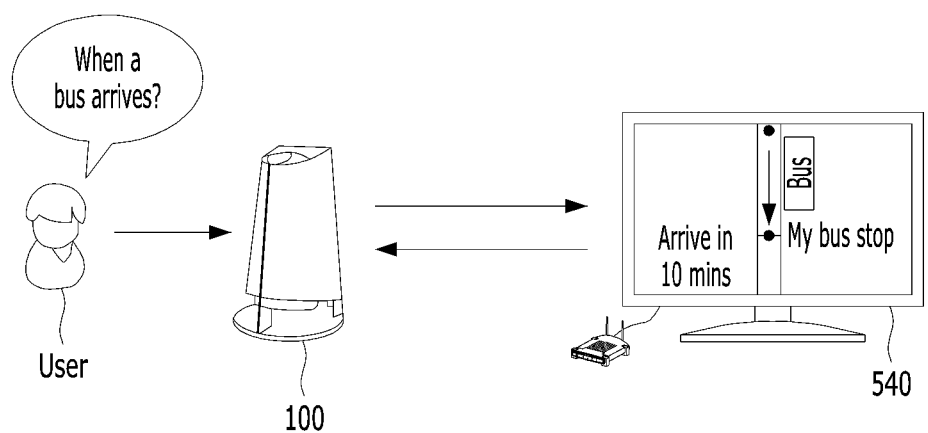

Referring to FIG. 22, user interactive device 100 receives third user speech " . . . when does my bus arrive?" In this case, central server 200 may extract voice commands of "bus" and "arrive" and determines a public transportation service based on the voice commands through a fourth internal service module (e.g., public translation service module).

Central server 200 may require cooperation with an external service server (e.g., public transportation server) for providing the determined serviced. In this case, central server 200 may request the external service server to perform at least one task associated with the determined service and provide a result of performing the task.

Central server 200 may output the result of performing the task received from the external service server and output the result on display 504 coupled to user interactive device 100.

Figure 23:
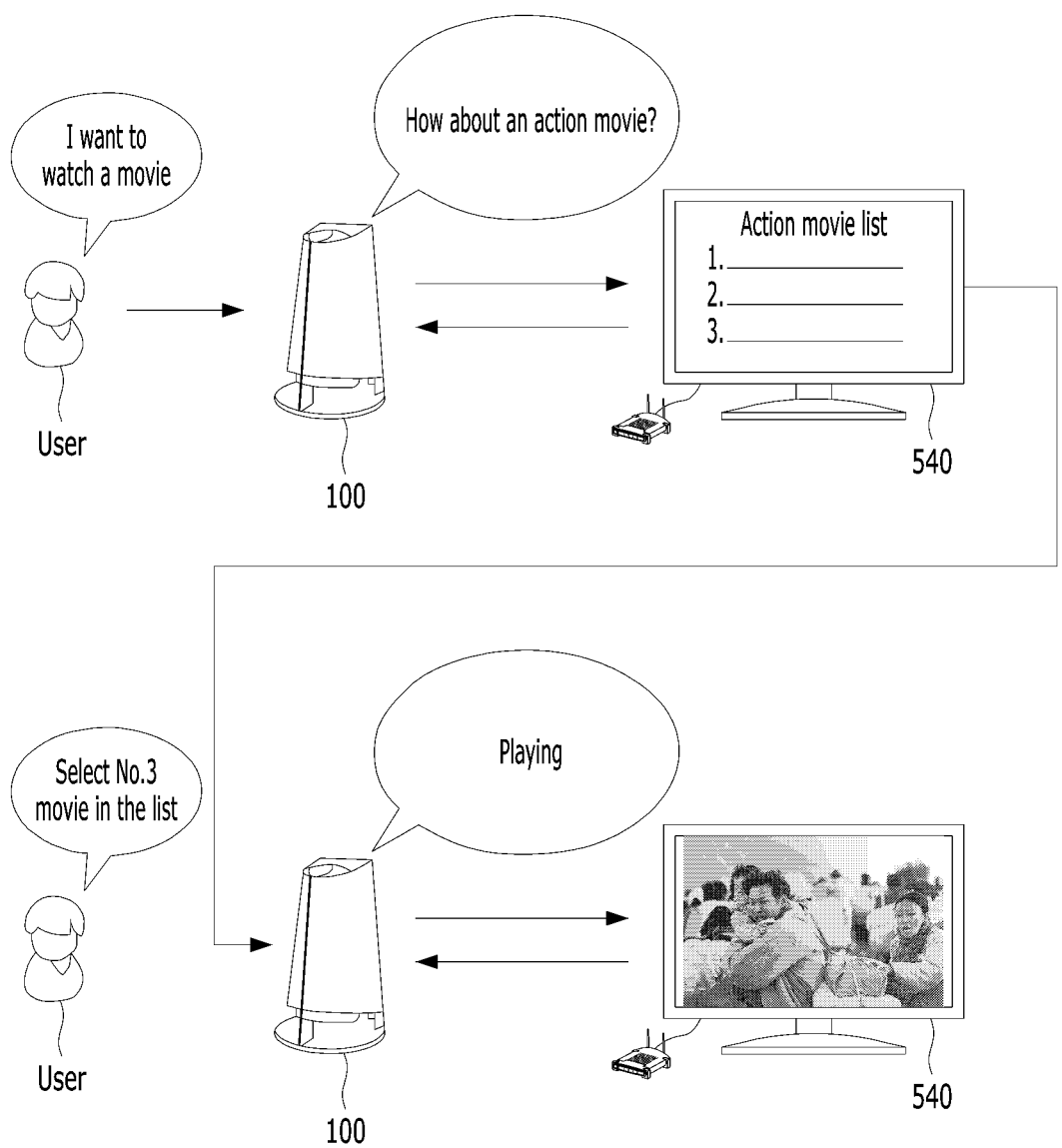

FIG. 23 shows examples of providing a VOD service as an internal service. Referring to FIG. 23, when user interactive device 100 receives user speech " . . . I want to watch movie . . . " or " . . . I am bored." In this case, central server 200 may extract voice commands of "watch," "movie," or "bored."

When central server 200 is unable to determine intention of user speech, central server 200 may request speech interpretation server 230 to determine the intention of user speech by transmitting the received user speech and the extracted voice commands to speech interpretation server 230.

Central server 200 may receive the interpretation result from speech interpretation server 2300 and determine a VOD service (e.g., moving suggestion service), as an internal service, based on the interpretation result. Based on the determined VOD service, central server 200 may search a list of movies that a user might like and provide the result through display 504 coupled to user interactive device 100. For example. central server 200 may output " . . . how about an action movie?" through speakers of user interactive device 100 and display a list of action movies on display 504 within a predetermined user interface of the VOD application. As shown, when the determined service is an internal service, central server 200 may provide a user interface of an associated service application in order to enable a user to perform tasks each associated with menus and options provided within the associated service application.

Then, user interactive device 100 receives another user speech " . . . select No. 3 movie in the list . . . " in response to the provided user interface of the VOD application. Central server 200 may extract voice commands of "No. 3 movie" from the user speech, fetch digital contents of third movie in the list, outputs " . . . playing the third movie in the list . . . " through speakers and reproduces the fetch digital contents of the third movie on display 540. Furthermore, when user interactive device 100 receives further another user speech related to menus and options of the provided user interface, central server 200 may perform tasks associated with the menus and options based on the user speech.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing voice interactive services by an artificial intelligence voice interactive system including a user interactive device coupled to a plurality of device, a central server, a plurality of internal service servers, and a plurality of external service servers each connected to the central server through a communication network, the method comprising:
   receiving, by the user interactive device, user speech from one of a user and the plurality of device coupled to the user interactive device;
   transmitting, by the user interactive device, the received user speech to the central server;
   determining, by the central sever, a service associated with the received user speech, wherein the determining includes analyzing and interpreting the received user speech to assess whether the service requires a task to be performed by the central server, the plurality of internal servers, or the plurality of external servers;
   receiving, by the user interactive device, at least one of control signals, audio and video answers from the central server and
   outputting the received audio and video answers through at least one of speakers and a display coupled to the user interactive device and controlling at least one of the plurality of device according to the control signals.

2. The method of claim 1, further comprising:
   displaying video contents on the display coupled to the user interactive device; and
   outputting the received audio and video answers while displaying the video contents.

3. The method of claim 2, comprising:
   controlling the displaying of the video contents according to the control signals.

4. The method of claim 2, comprising:
   displaying video data of the audio and video answers on at least one part of the display in an overlapping manner while displaying the video contents on the display.

5. The method of claim 4, comprising:
   displaying the audio and video answers in a form of text on at least one part of the display in an overlapping manner while displaying the video contents of the display.

6. The method of claim 2, comprising:
   receiving the user speech from the user while displaying the video contents on the display; and
   controlling the displaying of the video contents according to the control signals and audio and video feedbacks, answers generated based on analysis and interpretation results of the received user speech.

7. The method of claim 2, comprising:
   outputting, through a first speaker coupled to the display, a part of audio data of the video contents being displayed on the display; and
   outputting audio data of the audio and video answers through a second speaker of the user interactive device.

8. The method of claim 2, comprising:
   outputting i) a part of audio data of the video contents being displayed on the display and ii) audio data of the audio and video answers simultaneously through a second speaker of the user interactive device.

9. The method of claim 1, wherein the user interactive device directly analyzes and interprets the user speech upon receipt thereof, extracts at least one voice commend based on the analysis and interpretation results, and generates audio and video feedbacks and control signals as an answer in response to the voice command based on the analysis and interpretation results.

10. The method of claim 1, wherein the plurality of device is one of an Internet of Things (IoT) device and a user portable device.

* * * * *

UNITED STATES PATENT AND TRADEMARK OFFICE
CERTIFICATE OF CORRECTION

PATENT NO. : 10,650,816 B2
APPLICATION NO. : 15/872966
DATED : May 12, 2020
INVENTOR(S) : Sang-Wook Lee et al.

Page 1 of 1

It is certified that error appears in the above-identified patent and that said Letters Patent is hereby corrected as shown below:

In the Claims

In Claim 6, Column 42, Line 56-57, please replace "video feedbacks, answers" with --video answers--.

Signed and Sealed this
Thirteenth Day of October, 2020

Andrei Iancu
*Director of the United States Patent and Trademark Office*